United States Patent
Haine et al.

(10) Patent No.: US 10,901,505 B1
(45) Date of Patent: Jan. 26, 2021

(54) EYE-BASED ACTIVATION AND TOOL SELECTION SYSTEMS AND METHODS

(71) Applicant: Tectus Corporation, Saratoga, CA (US)

(72) Inventors: Dominic Philip Haine, Saratoga, CA (US); Scott Herz, Saratoga, CA (US); Renaldi Winoto, Saratoga, CA (US); Abhishek Bhat, Saratoga, CA (US); Ramin Mirjalili, Saratoga, CA (US); Joseph Czompo, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 16/662,842

(22) Filed: Oct. 24, 2019

(51) Int. Cl.
*G06F 3/01* (2006.01)
*G06T 19/00* (2011.01)
*G06F 3/0481* (2013.01)

(52) U.S. Cl.
CPC .............. *G06F 3/013* (2013.01); *G06F 3/012* (2013.01); *G06F 3/04815* (2013.01); *G06T 19/003* (2013.01)

(58) Field of Classification Search
None
See application file for complete search history.

(56) References Cited

U.S. PATENT DOCUMENTS

| | | |
|---|---|---|
| 5,844,544 A | 12/1998 | Kahn |
| 8,430,310 B1 | 4/2013 | Ho |
| 8,520,309 B2 | 8/2013 | Sprague |
| 8,764,185 B1 | 7/2014 | Biederman |
| 8,786,675 B2 | 7/2014 | Deering |
| 8,798,332 B2 | 8/2014 | Otis |
| 8,827,445 B1 | 9/2014 | Wiser |
| 8,870,370 B1 | 10/2014 | Otis |
| 8,874,182 B2 | 10/2014 | Etzkorn |
| 8,960,898 B1 | 2/2015 | Etzkorn |
| 8,964,298 B2 | 2/2015 | Haddick |
| 8,971,978 B2 | 3/2015 | Ho |
| 8,989,834 B2 | 3/2015 | Ho |
| 9,028,068 B2 | 5/2015 | Chang |
| 9,047,512 B2 | 6/2015 | Otis |
| 9,052,533 B2 | 6/2015 | Pugh |
| 9,153,074 B2 | 10/2015 | Zhou |
| 9,170,646 B2 | 10/2015 | Toner |
| 9,196,094 B2 | 11/2015 | Ur |
| 9,215,293 B2 | 12/2015 | Miller |
| 9,298,002 B2 | 3/2016 | Border |

(Continued)

*Primary Examiner* — Amy M Levy
(74) *Attorney, Agent, or Firm* — North Weber and Baugh LLP; Michael North

(57) ABSTRACT

Presented are eye-controlled user-machine interaction systems and methods that, based on input variables that comprise orientation and motion of an electronic contact lens, assist the wearer of the contact lens carrying a femtoprojector to control and navigate a virtual scene that may be superimposed onto the real-world environment. Various embodiments provide for smooth, intuitive, and naturally flowing eye-controlled, interactive operations between the wearer and a virtual environment. In certain embodiments, eye motion information is used to wake a smart electronic contact lens, activate tools in a virtual scene, or any combination thereof without the need for blinking, winking, hand gestures, and use of buttons.

18 Claims, 20 Drawing Sheets

(56) References Cited

U.S. PATENT DOCUMENTS

| | | |
|---|---|---|
| 9,298,020 B1 | 3/2016 | Etzkorn |
| 9,341,843 B2 | 5/2016 | Border |
| 10,345,621 B2 | 7/2019 | Franklin |
| 10,353,463 B2 | 7/2019 | Shtukater |
| 2009/0066722 A1 | 3/2009 | Kriger |
| 2011/0221659 A1 | 9/2011 | King, III |
| 2014/0063054 A1 | 3/2014 | Osterhout |
| 2014/0098226 A1* | 4/2014 | Pletcher ............ H04N 7/18 348/143 |
| 2014/0198128 A1 | 7/2014 | Hong |
| 2014/0347265 A1* | 11/2014 | Aimone ............ A61M 21/00 345/156 |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0338915 A1 | 11/2015 | Publicover |
| 2015/0339857 A1 | 11/2015 | O'Connor |
| 2015/0362753 A1* | 12/2015 | Pletcher ........ G06F 3/04842 351/159.03 |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0091737 A1 | 3/2016 | Kim |
| 2016/0133201 A1* | 5/2016 | Border .............. G06K 9/2018 345/694 |
| 2016/0253831 A1 | 9/2016 | Schwarz |
| 2016/0274660 A1* | 9/2016 | Publicover ....... G06K 9/00604 |
| 2016/0283595 A1* | 9/2016 | Folkens ............ G06F 16/583 |
| 2017/0019661 A1* | 1/2017 | Deering ............. G09G 5/391 |
| 2017/0123492 A1* | 5/2017 | Marggraff .......... H04N 5/247 |
| 2017/0177078 A1* | 6/2017 | Henderek .......... G06F 3/033 |
| 2017/0270636 A1* | 9/2017 | Shtukater ........ G02B 27/0179 |
| 2018/0120568 A1* | 5/2018 | Miller ............. G03B 21/2013 |
| 2019/0056785 A1* | 2/2019 | Suk ................. G06F 16/436 |
| 2019/0250408 A1* | 8/2019 | Lafon ................ B64D 43/00 |
| 2019/0377428 A1* | 12/2019 | Mirjalili ........... G06F 3/0346 |

* cited by examiner

EXEMPLARY SET OF ANGLES THAT MAY BE USED TO INITIATE AN ACTIVATION

LOOKING STRAIGHT AHEAD
Top and bottom sensors are covered by skin.
Left and right sensors are not.

SMART CONTACT LENS — 602

CAPACITIVE SENSOR — 606

LOOKING UPWARDS
Lower sensor is no longer covered.

LOOKING LEFTWARD
Left sensor is covered.

STARTING POINT: LOOKING STRAIGHT AHEAD SYSTEM IS ASLEEP

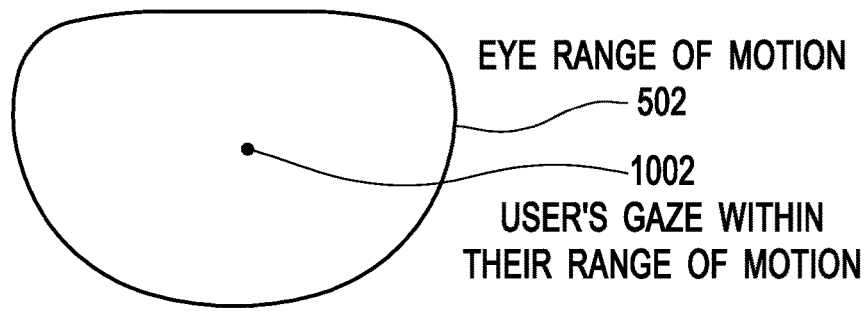

FIG. 10A

EYE RANGE OF MOTION
— 502
— 1002
USER'S GAZE WITHIN
THEIR RANGE OF MOTION

USER GLANCES TO A DESIGNATED AREA AROUND THEIR RANGE OF MOTION

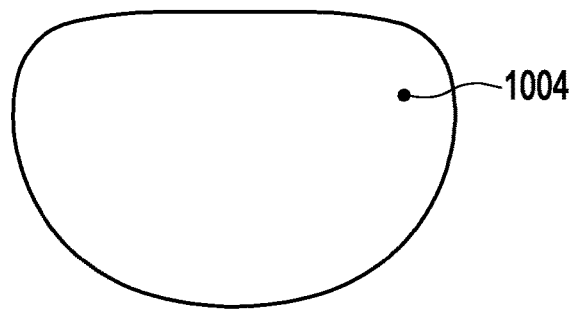

THE CL SYSTEM INSTANTLY ACTIVATES

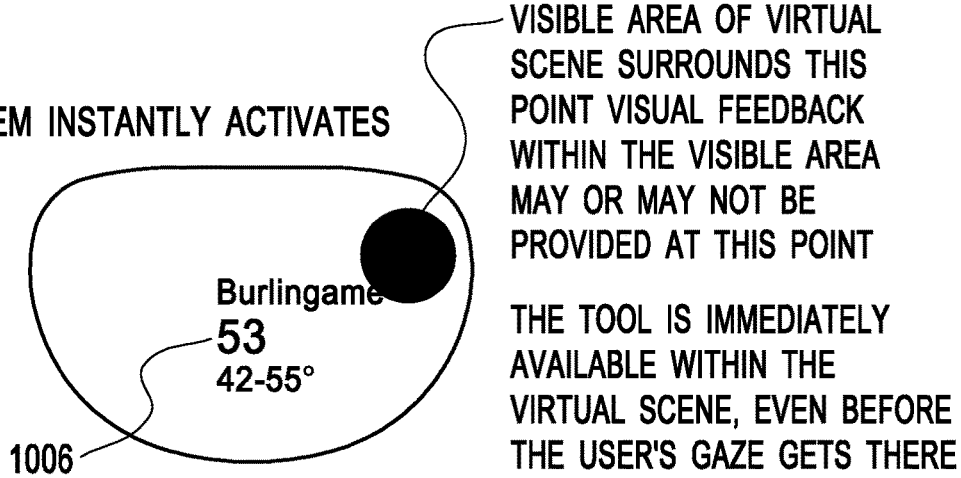

VISIBLE AREA OF VIRTUAL SCENE SURROUNDS THIS POINT VISUAL FEEDBACK WITHIN THE VISIBLE AREA MAY OR MAY NOT BE PROVIDED AT THIS POINT

THE TOOL IS IMMEDIATELY AVAILABLE WITHIN THE VIRTUAL SCENE, EVEN BEFORE THE USER'S GAZE GETS THERE

USER RETURNS GLANCE TO CENTRAL AREA / STARTING AREA

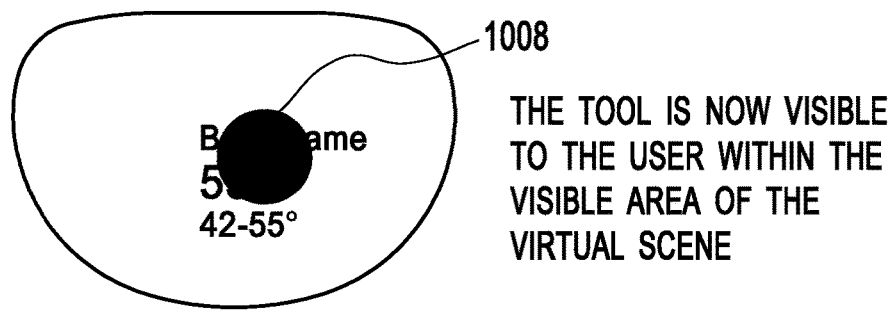

THE TOOL IS NOW VISIBLE TO THE USER WITHIN THE VISIBLE AREA OF THE VIRTUAL SCENE

1100
EYE GESTURES AS (TENTATIVE) ACTIVATION EVENTS
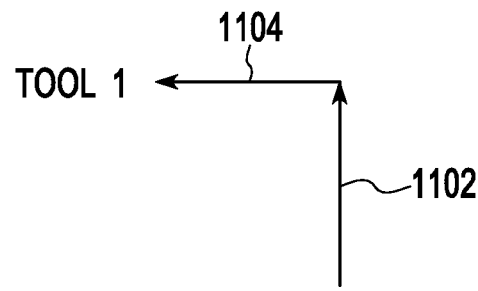
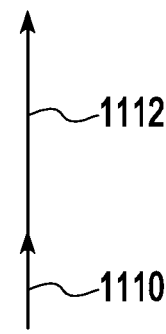
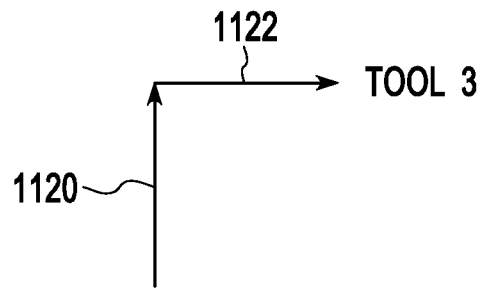
FIG. 11

EYE-BASED ACTIVATION AND TOOL SELECTION SYSTEMS AND METHODS

TECHNICAL FIELD

The present disclosure generally relates to eye-controlled systems and methods for activating tools within a virtual environment, and more particularly, a contact-lens system that allows a user to select virtual tools based on eye-movement that is tracked by sensors within a contact lens worn by the user. The subject matter of the present disclosure is related to U.S. patent application Ser. No. 16/522,608 filed on Jul. 25, 2019, entitled "Glance and Reveal within a Virtual Environment," listing inventors Dominic Philip Haine and Scott Herz, which document is herein incorporated by reference in its entirety and for all purposes.

BACKGROUND

The growth of AR/VR technologies across a large and diverse set of markets is well understood by one of skill in the art. Markets such as gaming, media, search, and information management implement a variety of different AR/VR products to allow an individual to interact with a virtual environment. These AR/VR products provide an individual a rich and dynamic platform in which the user can retrieve information, view media content, navigate virtual scenes and interact with other individuals in a manner unique to the AR/VR environment. It is important that these AR/VR products maintain a user-friendly experience throughout their use and avoid overloading a user with too much content and information, while concurrently managing the way in which the user interacts with the virtual environment; a task that is oftentimes difficult given the constraints of today's AR/VR products.

While AR/VR technologies offer users the ability to uniquely interact with virtual content in a virtual medium and enjoy an immersive user experience, these technologies are not without limitations. These technologies are oftentimes constrained by the way an individual can interact with the virtual environment. For example, many AR/VR products rely on hand-gestures, hand controllers, or other types of movement that must be translated into the virtual environment itself. These interactive movements are potentially obtrusive, hard to learn, tiring over time, inconvenient to use, and not available to those without facile motion of their arms or hands. Further, such movements may appear awkward in a social context, thus, negatively impacting the overall experience.

Accordingly, what is needed are systems and methods that allow a user to activate a smart contact lens on demand and navigate tools in a virtual scene, while maintaining a positive overall experience.

BRIEF DESCRIPTION OF THE DRAWINGS

FIG. 10A-FIG. 10D illustrate an exemplary method for highlighting tools according to embodiments of the present disclosure.

FIG. 11 illustrates exemplary methods for interpreting a user's eye motion as an activation or tentative activation of the system according to embodiments of the present disclosure.

DETAILED DESCRIPTION OF EMBODIMENTS

The figures and the following description relate to various embodiments by way of illustration. It is noted that from the following discussion, alternative embodiments of the structures and methods disclosed herein will be readily recognized as viable by one of skill in the art. It is further noted that any headings used herein are only for organizational purposes and shall not be used to limit the scope of the description or the claims. All documents cited are incorporated by reference herein in their entirety.

Embodiments of the present invention allow a user to wear dynamic contact lenses that provide a virtual framework for the user to retrieve information and interact with his/her environment. A user may select one or more tools within a virtual environment generated by the contact lenses. This selection of virtual tools is designed to allow a user to select and activate a virtual tool by performing pre-defined eye movements that are recognized by the system. The selection of virtual tools may also include the use of an auxiliary device, such as a watch, piece of jewelry, or other device external to the contact lens, which allows the user to identify to the system an intent to activate one or more tools. This unique way of activating virtual tools allows a user to interact with a virtual environment, generated by contact lenses, in a way that is not blatantly obvious to others proximate to the user.

Figure 1:
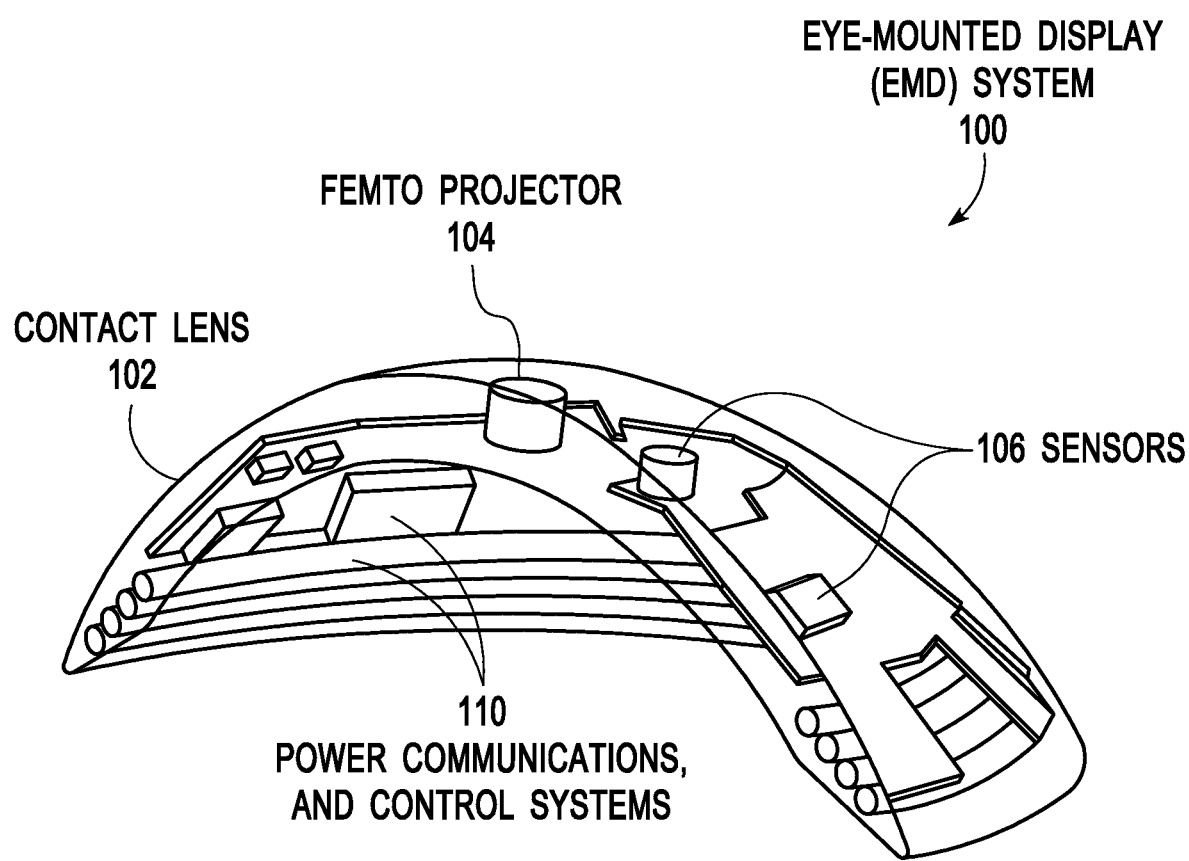
FIG. 1 illustrates an exemplary electronic contact lens according to embodiments of the present disclosure.

FIG. 1 illustrates an exemplary electronic contact lens according to embodiments of the present disclosure. The electronic contact lens 100 allows a user to interact with a virtual environment such that eye movement is translated into a visible virtual scene within a larger virtual environment. The electronic contact lens 100 may be implemented as a contact lens 102, such as a scleral contact lens designed to be fixed on the wearer's eyeball. Embedded on the contact lens 102 may be femtoprojector 104, sensors 106, and power, communications, and control systems 110. Femtoprojector 104 may be implemented as a miniature video projector that projects images on the part of the wearer's retina centered on the fovea—the highly sensitive, i.e., high-resolution region of the retina that is referred to when the eye directly gazes or inspects an object. Sensors 106 may comprise any type of motion sensors, such as accelerometers, magnetometers, and gyroscopes, and image sensors (such as a camera) that may be used for eye-tracking functionality.

The power, communications, and control systems 110 comprise coils that enable inductive power transfer, or an energy storage device, such as a battery, that can deliver sufficient energy to operate electronic contact lens 100 for a period of time. Various electronic contact lenses may also include transceivers for communication with internal and/or external devices, and various controllers that control circuits and sub-circuits.

The user of an eye-controlled electronic contact lens 100 may use any combination of eye movements and other signals to interact with a virtual scene within a virtual environment. This interaction may be supplemented with various auxiliary devices such a wearable head-mounted eye-tracking device, a smartphone, a hand-held controller, other body sensor, electronic jewelry or any other type of device that can communicate with the electronic contact lens.

It is noted that certain tasks performed by electronic contact lens 100 may equally be performed, for example, by an auxiliary device (not shown in FIG. 1) that may be communicatively coupled with electronic contact lens 100 and, in embodiments, provides power via inductive coupling. Exemplary accessory devices, femtoprojectors, and their functions and components are described in greater detail in U.S. patent application Ser. No. 15/959,169, filed on Apr. 21, 2018, entitled "Power Generation Necklaces that Mitigate Energy Absorption in the Human Body," listing inventors Miller et al.; U.S. patent application Ser. No. 15/966,481, filed on Apr. 30, 2018, entitled "Multi-Coil Field Generation In An Electronic Contact Lens System," listing inventors Owens et al.; U.S. patent application Ser. No. 15/966,475, filed on Apr. 30, 2018, entitled "Multi-Coil Field Generation In An Electronic Contact Lens System," listing inventors Owens et al.; U.S. patent application Ser. No. 15/984,182, filed on May 18, 2018, entitled "Power Generation Necklaces that Reduce Energy Absorption in the Human Body," listing inventors Owens et al.; U.S. patent application Ser. No. 16/035,640, filed on Jul. 15, 2018, entitled "Eye-mounted Displays Including Embedded Conductive Coils," listing inventors Mirjalili et al.; and U.S. patent application Ser. No. 16/227,139, filed on Dec. 20, 2018, entitled "Eye-Mounted Display System Including A Head Wearable Object," listing inventors Pang et al., which patent documents are incorporated by reference herein in their entirety and for all purposes.

In embodiments, the auxiliary device may comprise circuitry to communicate via an electronic communication protocol with contact lens 102 and directly or indirectly (e.g., via the user's phone) with an external network (e.g., Internet). The auxiliary device may perform various computationally intensive tasks in lieu of electronic contact lens 102, such as computing some or all of the display data for femtoprojectors 104. In addition, the accessory device may serve as an intermediate data storage tool that increases the storage capacity of electronic contact lens 100.

In embodiments, electronic contact lens 100 and/or the auxiliary device manages how, where, and when a virtual object in a virtual scene is displayed within a given coordinate space. The electronic contact lens and/or auxiliary device may update the content and layout of a virtual scene including the graphical representation of objects on the display according to user's eye-movement. As will be explained in detail below, this content update allows the user to scan a virtual scene by effectively updating a projected image correlated to where the user is looking within the scene itself.

In embodiments, eye-movements may be tracked, estimated (e.g., using a Kalman filter algorithm) and/or predicted based on motion, image, sensor data or a combination thereof. Data derived from such eye movements may include timing and sequences of saccadic movements, eye direction (e.g., eye angle, elevation, roll, yaw), the fixation point in space, orientation of head/body, and body position data. This data may also take into account wearer-specific conditions, such as physical and biological characteristics, that relate to the user's range of eye-motion, eye muscle irregularities, and other limiting factors and context that may vary over time.

Figure 2A:
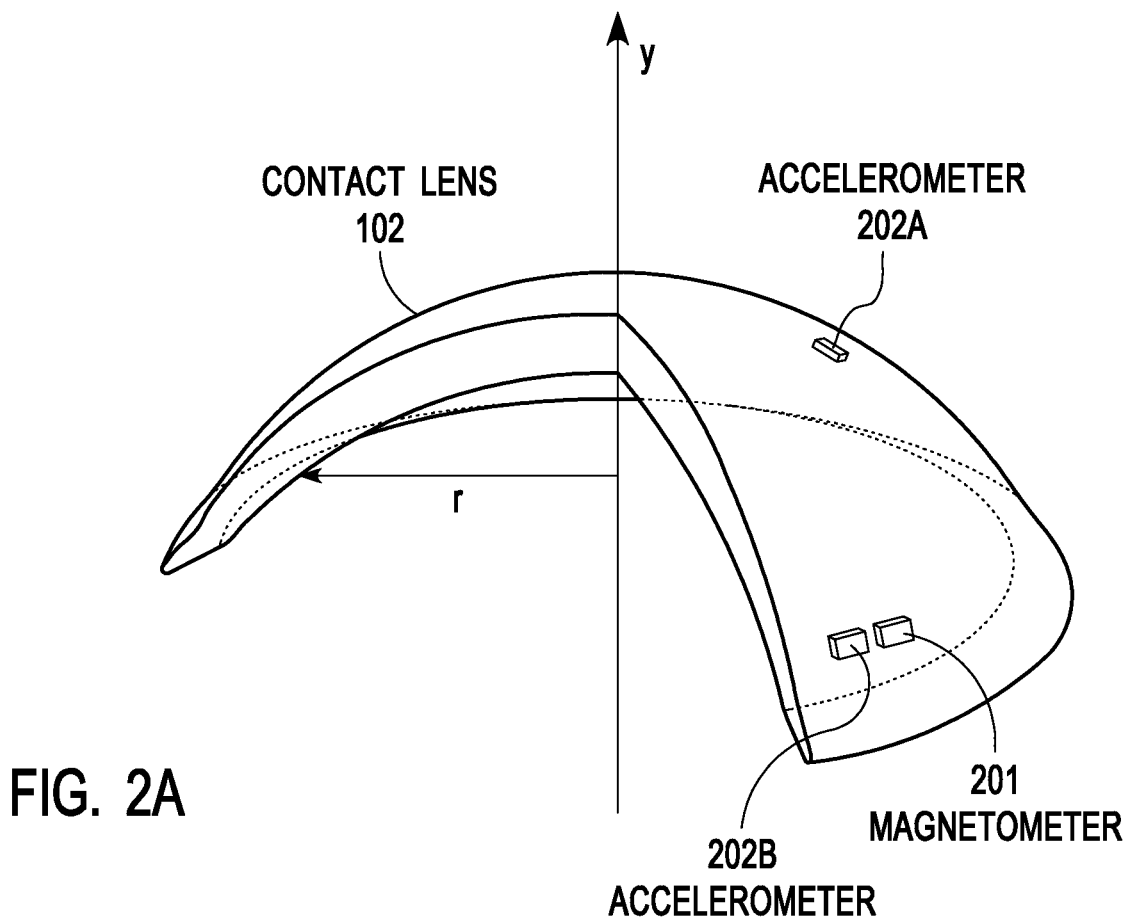
FIG. 2A illustrates an exemplary electronic contact lens comprising motion sensors according to embodiments of the present disclosure.

FIG. 2A illustrates an exemplary contact lens comprising motion sensors according to embodiments of the present disclosure. As depicted in FIG. 2A, contact lens 102 may be a scleral contact lens. Contact lens 102 comprises magnetometer 201 and accelerometers 202A and 202B that may be embedded within contact lens 102. It is understood that any number and type of sensors may be used to perform the tasks related to the objectives of the present disclosure. Suitable sensors may be used to sense eye movements to determine distance, speed, acceleration, orientation, path, angle, rate, etc. Various types of sensors and their strategic locations on contact lens 102 are described in more detail in in U.S. patent application Ser. No. 16/005,379, filed on Jun. 11, 2018, entitled "Contact lens gaze tracking architectures," listing inventors Mirjalili et al. and U.S. patent application Ser. No. 16/200,039, filed on Nov. 26, 2018, entitled "Eye-mounted Displays Including Embedded Solenoids," listing inventors Mirjalili et al., which patent documents are incorporated by reference herein in their entirety and for all purposes.

In embodiments, magnetometer 201 and accelerometers 202A, 202B may be used as motion sensors to detect and track the orientation of contact lens 102 and, thus, the orientation of the eye of the user. In other embodiments, a gyroscope or outward-facing image sensor may be deployed within the contact lens 102 to replace or supplement the sensors described above. Other sensors located on the body or head may also be involved.

In embodiments, raw sensor data from sensors 201, 202 may be converted into control signals that may be used to control, activate, deactivate, navigate, or select virtual objects in a virtual scene. This type of interaction between a user and a virtual scene allows for a smooth, intuitive, and effortless manner in which a user can navigate a scene and extract information therefrom.

Figure 2B:
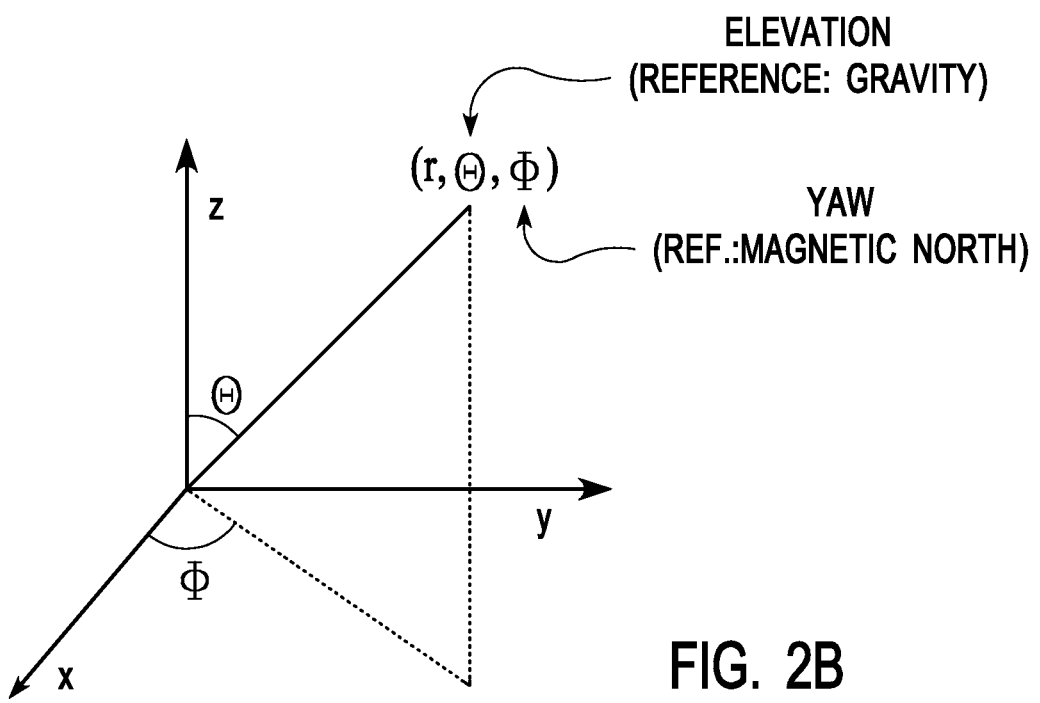
FIG. 2B shows a polar coordinate system that serves as reference frame for components in the electronic contact lens shown in FIG. 1.

FIG. 2B shows a spherical coordinate system that may serve as a reference frame for components in the electronic contact lens shown in FIG. 1. According to the convention presented in FIG. 2B, the reference for an elevation sensor, such as an accelerometer, may be the polar angle θ that is directed along the earth's gravitational field. The reference for a yaw sensor, such as a magnetometer, may be the magnetic north pole and may be tracked using an azimuthal angle φ. It is understood that a reference frame may be defined in any arbitrary convention, including a polar coordinate system, a cylindrical coordinate system, or any other system known in the art.

Figure 2C:
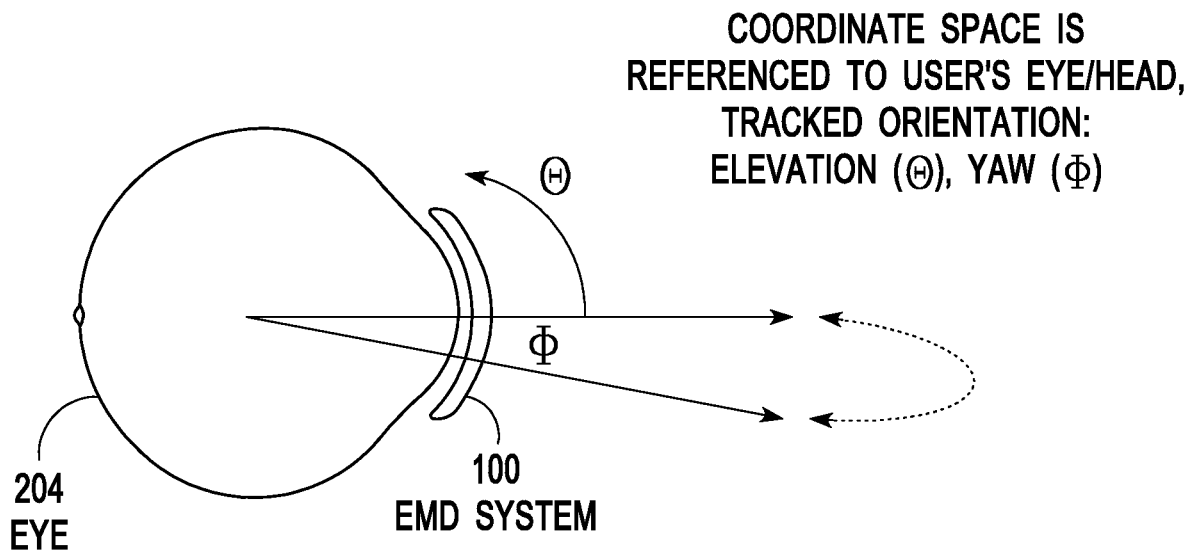
FIG. 2C and FIG. 2D illustrate various conventions for reference frames for the electronic contact lens shown in FIG. 1.
Figure 2D:
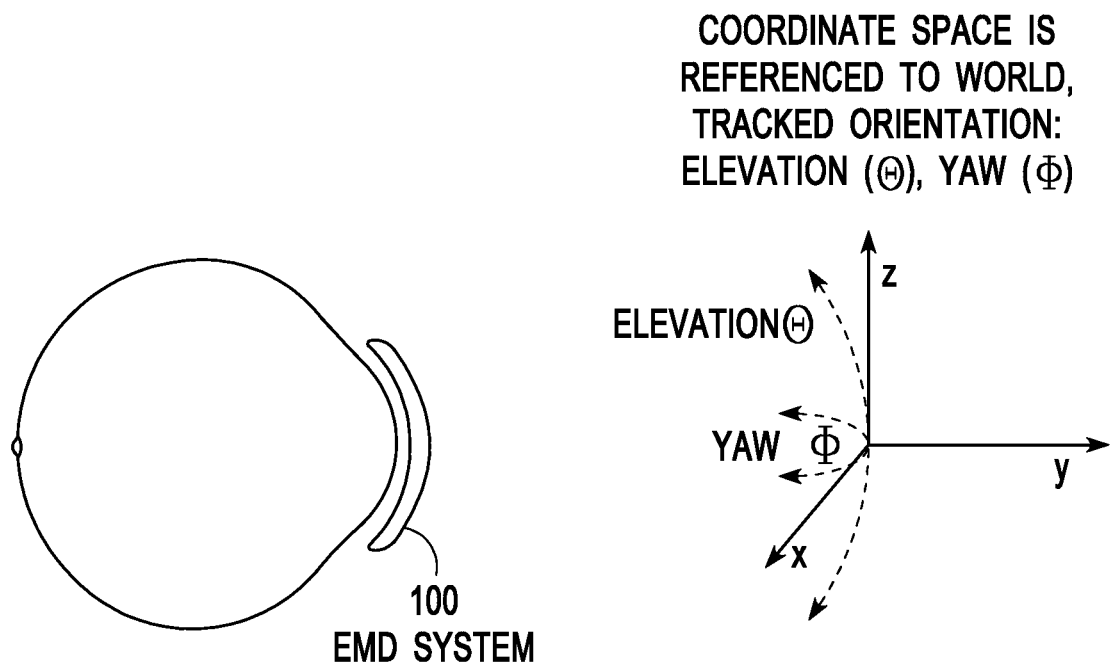

FIG. 2C and FIG. 2D illustrate various conventions for reference frames for the electronic contact lens shown in FIG. 1. FIG. 2C refers to the coordinate space of the user's eye 204 or head to enable eye-tracking or head-tracking by tracking polar angle θ (i.e., up/down elevation) and azimuthal angle φ (i.e., left/right rotation). FIG. 2D refers to the coordinate space of the user's environment to enable "world-tracking," by tracking angles θ and φ, representing elevation and yaw, respectively. In a world-tracked system, objects in the virtual environment appear locked at locations in the user's environment, irrespective of how the user moves his/her eyes, head or body.

In embodiments, mathematical transformations may be utilized to facilitate transitions between reference frames, coordinates, and parameters to enable smooth transitions at suitable rates when a user visually navigates and interacts with virtual objects in the coordinate space of a virtual scene. A transition may involve switching from a reference frame to which the user's eyes or head are fixed to one where it is the user's body that is fixed. For example, a first frame of reference, e.g., for the user's head, may be derived from a second frame of reference for the user's eyes by taking into account the orientation of the user's eyes and the manner in which the user's head follows the user's eyes. In addition, a transition may involve transitioning between various reference frames that are associated with different objects in a virtual scene, e.g., objects that are fixed to different reference frames.

Figure 3:
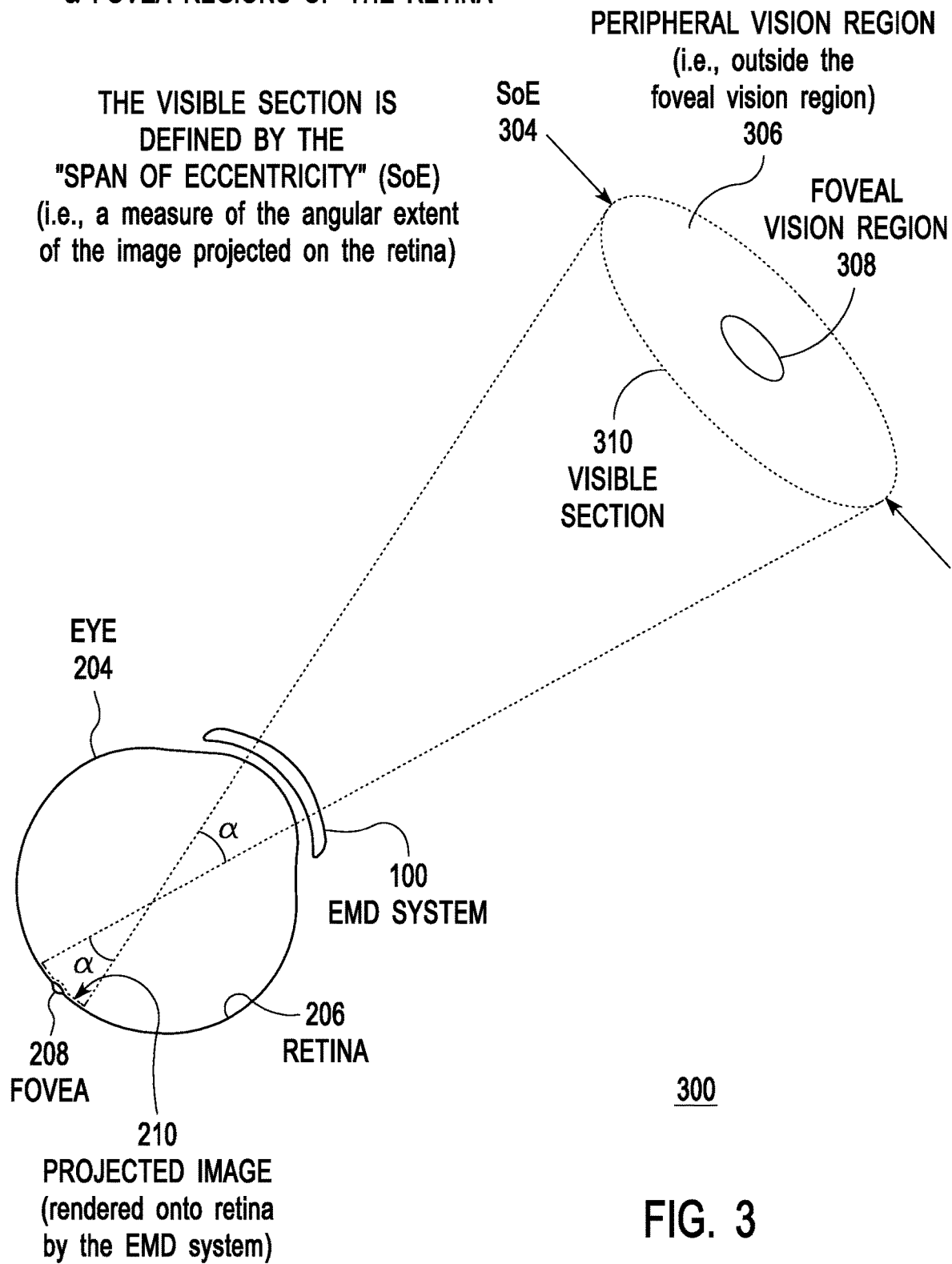
FIG. 3 illustrates the concept of Span of Eccentricity (SoE) according to embodiments of the present disclosure.

FIG. 3 illustrates the concept of Span of Eccentricity (hereinafter, "SoE") according to embodiments of the present disclosure. In this document, the term "projected" is used interchangeably with the terms "displayed." Similarly, the term "user" is used interchangeably with the term "wearer." "Activating" refers to exiting a standby (sleep) modes or switching to a wake model; triggering; or selecting, enabling, displaying, or otherwise making available a virtual tool, event, or area. "Span of Eccentricity" refers to the angular width of the image 210 centered on the line of gaze, extending into the peripheral vision. As depicted in FIG. 3, projected the image 210 is the visible section of a virtual scene, such as that depicted in FIG. 4B. In embodiments, looking outward from eye 204, the image 210 that is projected onto retina 206 by electronic contact lens 100 appears to have an angular width in the outside world equal to that of the SoE 304.

In embodiments, because electronic contact lens 100 is fixed on eyeball 204, the image 210 projected by electronic contact lens 100 is ordinarily fixed (i.e., locked) to and moves together with eyeball 204. As a result, the wearer sees projected image 210 displayed on retina 206 irrespective of where wearer of electronic contact lens 100 directs his/her eye 204 (or any other body parts). In fact, the wearer of electronic contact lens 100 cannot even look at or fixate eye 204 anywhere other than about the center of SoE 304; specifically, the foveal vision region 308 (the fovea extends from zero to about 1.5° eccentricity about 3° within the SoE). Thus, irrespective of where eye 204 moves, the wearer cannot look at or inspect objects or images appearing outside of foveal vision region 308 at the edges of SoE 304 as those images remain only in the wearer's peripheral vision region 306. Stated differently, while the wearer of electronic contact lens 100 may recognize that a virtual object is present at the edge of projected image 210, without additional capability, the wearer is unable to direct his/her gaze there. Because eye movements alone do not change the content and location of what is projected on the wearer's retina 206, the attempt to gaze at an object displayed in peripheral vision region 306 is rendered futile.

A person of skill in the art will appreciate that the concept of SoE is markedly different from, and not to be confused with, the concept of "field of view" as used in connection with conventional displays, such as computer monitors, TVs, or displays on eyeglasses (i.e., the angular separation between the edges of a display). For instance, if a user has to move his/her eyes by an angle of 50 degrees from one edge of a conventional display to the opposite edge, the field of view is said to be 50 degrees wide.

In contrast to a traditional display, a canvas that has a fixed width and height that define the user's field of view, here, the entire world around the user's head/eyes is the virtual canvas. This is true even if the image displayed on retina 206 is a portion of the canvas that is covered by SoE 304, i.e., what is seen at any moment in time when eye 204 does not move. The extent of the virtual canvas is practically unlimited in that moving SoE 304 (i.e., the visible portion) allows the user to view a virtual scene in all directions (i.e., 360 degrees around the user) with no boundaries and without a "field of view" limitation. In an AR system, the visible area is the same as the field of view of the display area. Despite the limited field of view, a user can look around a larger virtual scene in an AR system by turning the head.

As discussed in greater detail below, to enable direct inspection of objects in a virtual scene with highly sensitive fovea 208 that are located outside of foveal region 308 or outside SoE 304, the projected image 210 is updated to move SoE 304 to the new location within the virtual scene. The updated image is correlated to the movement of the eye 204 and electronic contact lens 100 to render the appropriate segment of the virtual scene to the user. For example, if a movement of eye 204 in one direction occurs, the projected image 210 may be updated in an opposite direction such as to allow the user to scan the virtual scene.

Overall, unlike for conventional displays, such as monitors, phone screens, AR glasses/goggles, or other types of displays in the pertinent art, the wearer of a contact lens comprising electronic contact lens 100 does not perceive images generated by the image projector and displayed within SoE 304 as being in a "field of view."

Figure 4A:
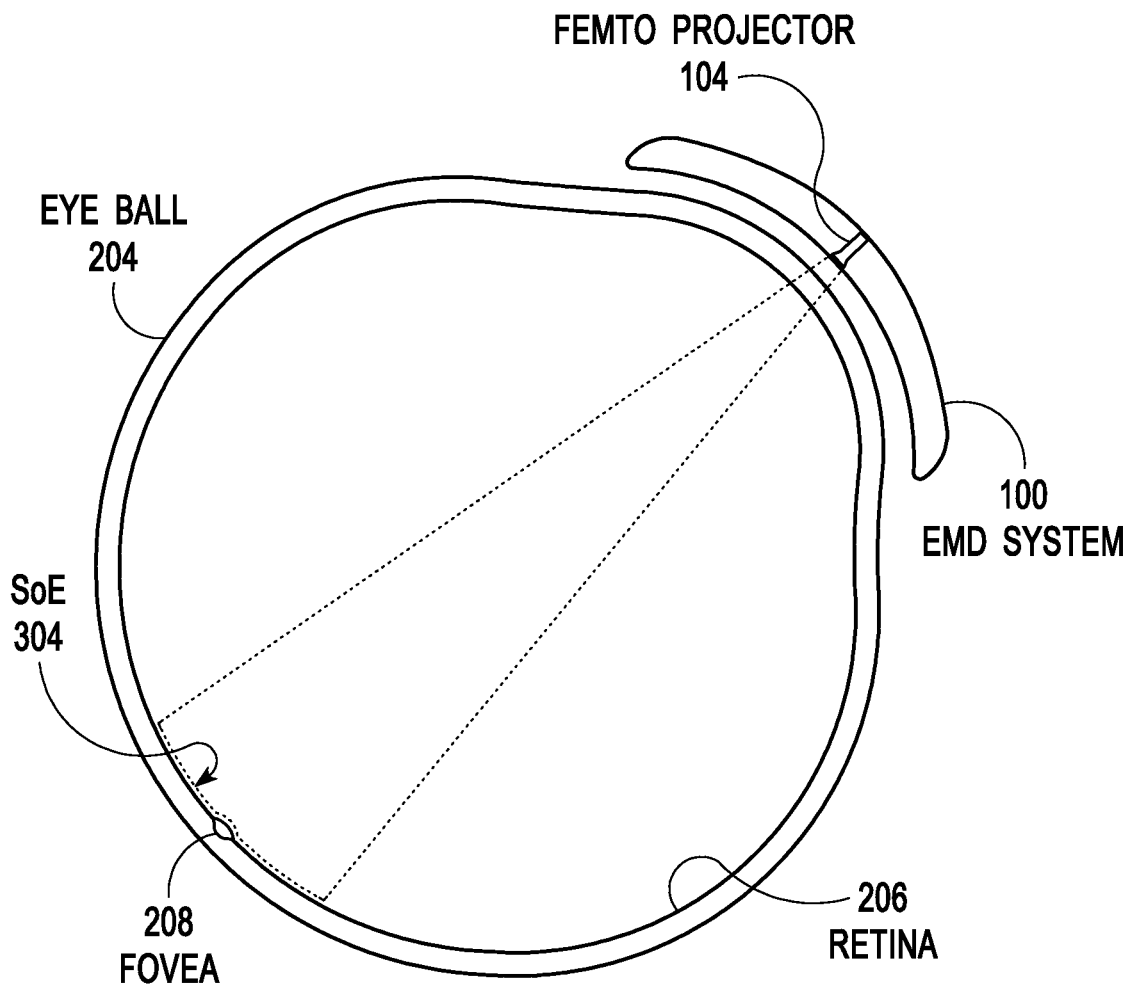
FIG. 4A illustrates projecting onto the retina the visible portion of a virtual image according to embodiments of the present disclosure.

FIG. 4A illustrates projecting onto the retina the visible portion of a virtual image according to embodiments of the present disclosure. Electronic contact lens 100 comprises femtoprojector 104 that may be embedded with a contact lens. In embodiments, femtoprojector 104 may be implemented as a miniature video projector (hereinafter "femtoprojector") that comprises an image source (e.g., a light-emitting-diode microdisplay) and an optical system that projects an image generated by the image source directly onto retina 206 to cause the image to appear in the user's field of vision. A femtoprojector has been proposed by Deering. See, e.g., U.S. Pat. No. 8,786,675, "Systems using eye mounted displays." One type of femtoprojector is based on a tiny projector mounted inside a contact lens. The projector projects images onto the retina of a person wearing the contact lens. The projector must be sufficiently small (less than 2 mm×2 mm×2 mm by cubic volume) to fit inside or on a contact lens that can be worn on a person's eyeball, such that, for convenience, Deering called it a "femtoprojector." A femtoprojector preferably is no larger than about one or two millimeters in any dimension. In embodiments, the femtoprojector's optical system may be implemented using a cylindrical, solid plastic, dual-mirror design. While being constrained to the physical dimensions of a contact lens, the optical system provides appropriate magnification and sufficient image quality.

It is understood that one or more femtoprojectors 104 may be used, for example, one femtoprojector 104 that projects an image directly onto fovea 208, which contains the highest number of retinal receptive fields, i.e., generating the highest resolution images on retina 206. And a different, lower resolution femtoprojector 104 may be used to project images mainly onto the "lower-resolution" peripheral region of retina 206 that cannot resolve the higher resolution images.

It is noted that electronic contact lens 100 may be used in VR applications, AR applications, mixed reality applications, and the like. In virtual reality applications, the image projected by electronic contact lens 100 replaces what the user would normally see in the external environment, whereas in AR and mixed reality applications, the projected images appear superimposed onto the external environment, such that the projected image augments or adds to what the user sees in the real world.

Figure 4B:
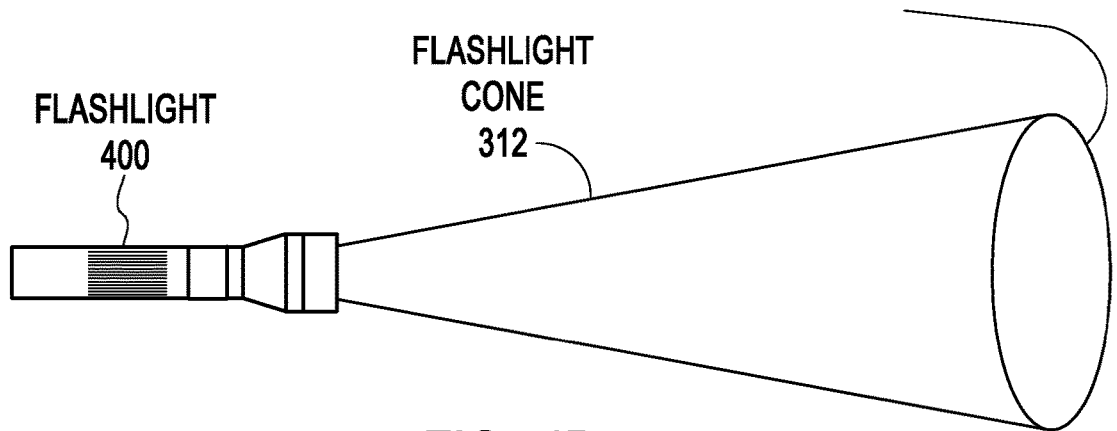
FIG. 4B and FIG. 4C illustrate the concept of SoE using a flashlight analogy.
Figure 4C:
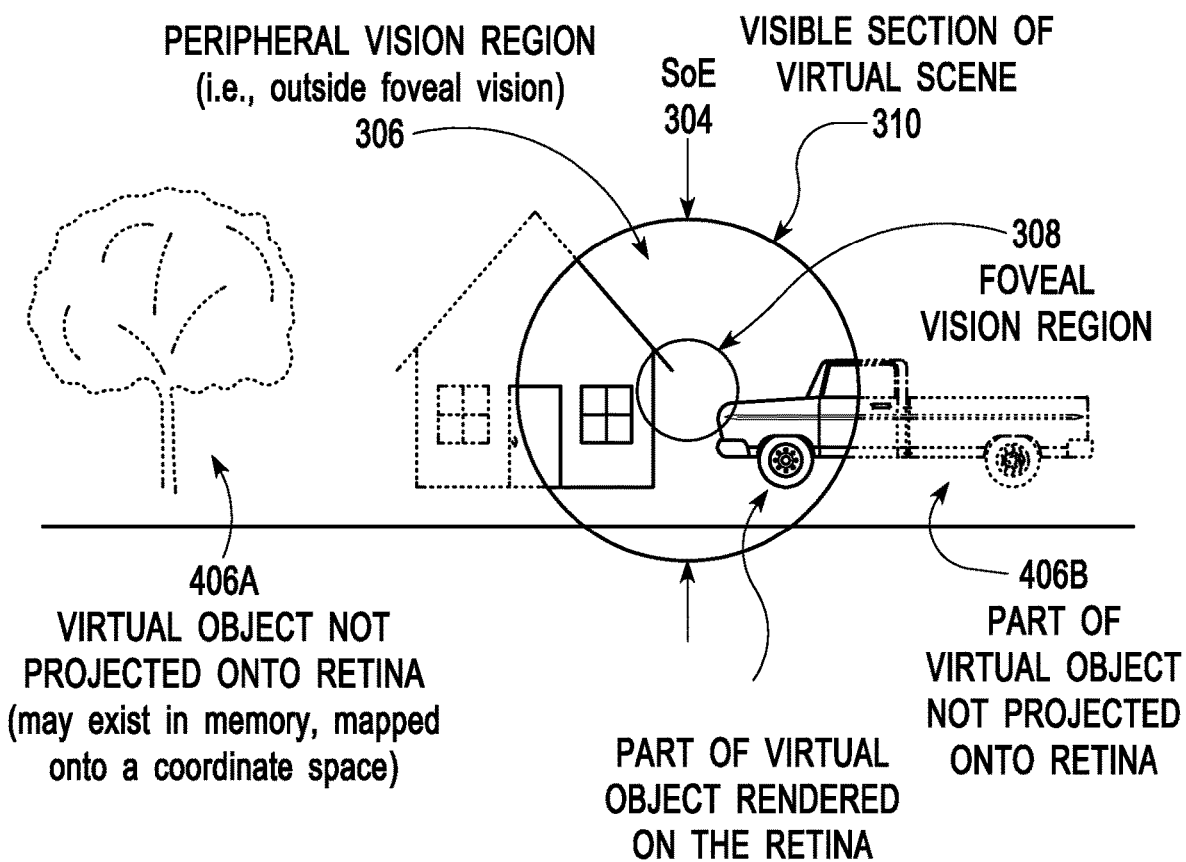

FIG. 4B and FIG. 4C illustrate the concept of SoE by using a flashlight analogy. In certain aspects, the notion of an SoE making visible just a section of the larger virtual scene is analogous to looking at objects in a dark environment (FIG. 4C) illuminated only by a flashlight (FIG. 4B). In both cases, only the portion of the 2D or 3D scene that is "illuminated" by SoE 304 or the conical beam 312 of the flashlight is visible at a given moment. This analogy assumes that a defined circular edge exists around the circumference of the projected flashlight that effectively limits the visible region within the circumference of the flashlight relative to a virtual scene.

Depicted in FIG. 4C is a virtual scene that comprises visible section 310 and invisible sections of virtual scene 406 defined by what is displayed within the SoE 304 at any moment in time. The image displayed in visible section 310 has a circular shape, similar to the projection produced by flashlight 400. As the visibility of items illuminated by shining a flashlight onto them is confined to the illuminated surfaces, a femtoprojector projects images onto a limited (here, circular) visible section 310 corresponding to, for example, a 25-degrees-wide SoE 304. Therefore, as shown in FIG. 4C, visible section 310, which comprises foveal 308 and peripheral 306 vision regions, correspond to the base of a 25 degrees-wide cone in the coordinate space of the virtual scene.

Objects 406A and partial objects 406B in FIG. 4C that do not fall within visible section 310 are not displayed on the retina and, thus remain invisible to the eye until being recalled from computer memory (or derived from stored information) and included within SoE 304 by the image projector that renders the recalled objects onto the retina, in response to the user turning their eye in the direction of those objects. In short, moving the eye and SoE 304 to look around a virtual image or scene bears resemblance to scanning a surface in the dark by illuminating the surface with a flashlight. Accordingly, the image projector effectively updates the SoE 304 relative to eye movements of a user by loading a corresponding portion of the virtual image and updating what is projected onto the eye.

It is noted that while images rendered onto the retina are depicted as being circular in FIGS. 4A-4C, this is not intended as a limitation on the scope of the present disclosure, since any shapes, such as ellipsoids, rectangles, hexagons, or any arbitrary shapes, may equally be used.

Unlike an actual flashlight that allows eyes to inspect (i.e., move toward or look at) any part of the illuminated area, including objects that are located at or near the edges of the illuminated area, the concept of the SoE does not allow the wearer of an EMD system to inspect or move the eye to directly look at the edge of visible section 310 to view off-center regions 306 of visible section 310 that are projected outside of foveal vision region 308. In embodiments, in response to detecting an attempt to inspect an object or image that is displayed at the edge of visible section 310, a displayed object may be re-rendered, such as to move from the edge, the users' peripheral vision region 306, to the user's foveal vision region 308 to enable the user to inspect objects anywhere in a virtual scene, including objects originally located outside of foveal vision region 308.

It is noted that embodiments presented herein may equally be used non-EMD systems, such as AR, VR, MR, and XR displays, in related applications to enable a clutter-free, naturally flowing, and user-friendly navigation. One skilled in the art will recognize the difficulty in allowing a user to interact with virtual tools available within the virtual environment displayed on the user's retina. The discussion below identifies different embodiments that allow a user to select and activate a virtual tool based on tracked eye movements and/or simple physical interaction with an auxiliary device.

Figure 5A:
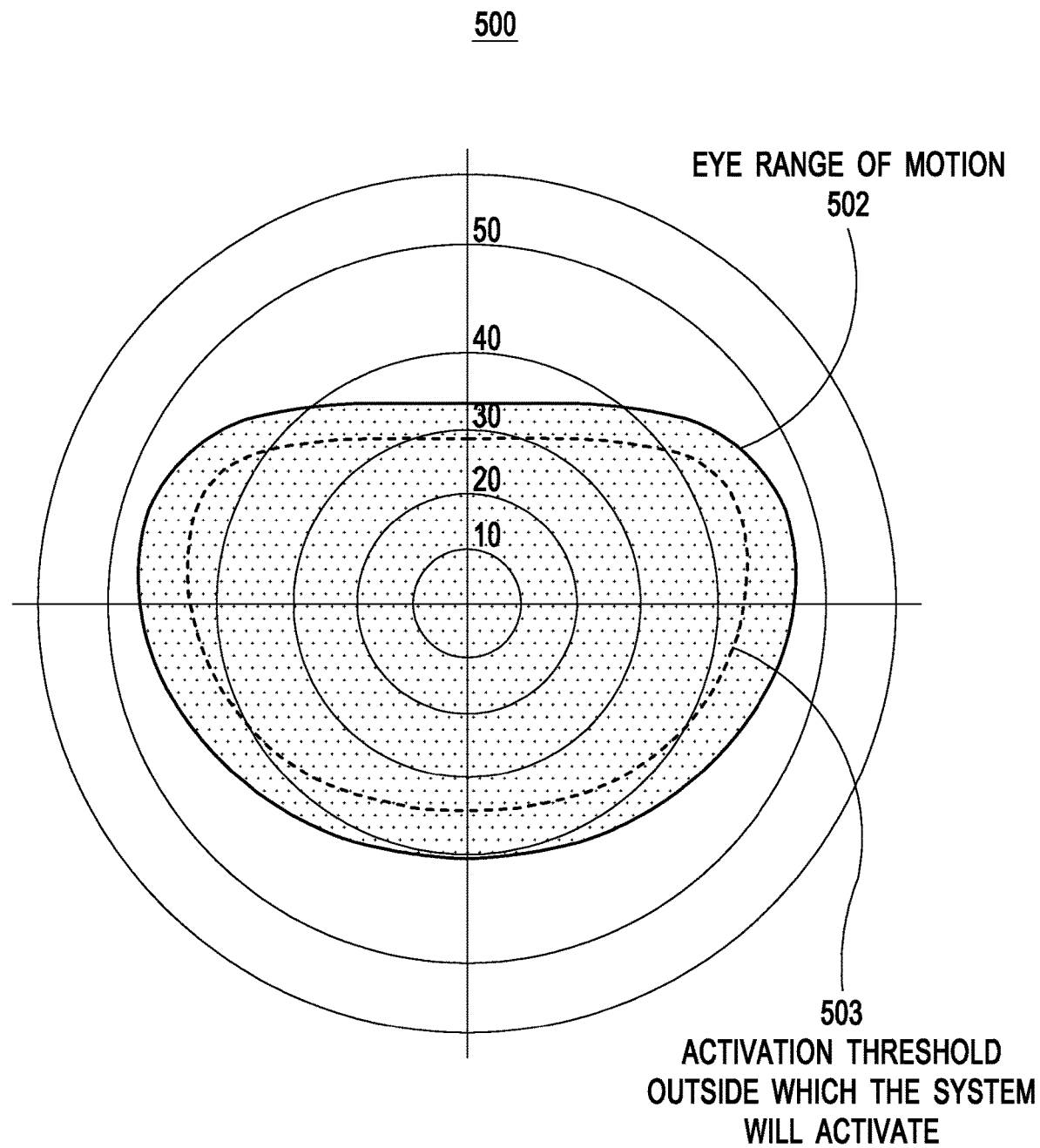
FIG. 5A illustrates a "virtual tool activation chart" comprising an exemplary activation threshold according to embodiments of the present disclosure.

FIG. 5A illustrates a virtual tool activation chart comprising an exemplary activation threshold according to embodiments of the present disclosure. Chart 500 represents a common range of motion 502 of a pair of human eyes, not accounting for variations between individuals. In general, activation chart 500 shows the angles from the center point that a person can directly aim the central focus of their eyes without moving the head. Note that chart 500 does not take into account peripheral vision. Ranges of motion 502 for the human eye are greater than 95° horizontally and 75° vertically. Yet, most of the time, the eye operates in the central region of range 502 rather than at the periphery of range 502. Therefore, in embodiments, eye motion towards or directed at the periphery of range 502 may be advantageously used to wake or activate a virtual tool. In certain examples, particular virtual tools are associated with certain points along the activation threshold 503, which allows a user to activate a desired virtual tool by looking beyond an associated point along the activation threshold 503.

As depicted in FIG. 5A, chart 500 comprises activation threshold 503 that an electronic contact lens may utilize as a trigger to initiate an action. As discussed in greater detail below, an electronic contact lens, an external eye tracker of an AR headset, etc., may monitor eye motion to determine where in range 502 the eye is directed to determine whether activation threshold 503 has been crossed. If so, the corresponding eye motion may be interpreted as the user's intent to initiate an action, such as activating the electronic contact lens (e.g., by exiting a sleep mode), activating a virtual tool, or any sequence of actions, such as both activating the electronic contact lens and selecting a tool, e.g., in a single action.

Various embodiments determine that the gaze reaches activation threshold 503 or that it approaches the edge of the eye's range of motion 502, for example, by detecting that the eye is rotated relative to the user's head or eye socket. In embodiments, eye heading relative to the Earth's magnetic field may be measured using a magnetometer disposed within the smart contact lens, and pitch may be measured relative to Earth's gravitation field by using accelerometers.

Head position may be measured by a head tracking apparatus that may track the user's head position, for example by using an inertial measurement unit (IMU), the IMU may comprise a magnetometer attached to the head to detect the compass heading of the head relative to the Earth's magnetic field and accelerometers that track head pitch relative to Earth's gravitation field.

In embodiments, eye angles may be compared to head angles to determine eye yaw and pitch relative to the head. If, for a given angle from the center point of chart 500 in FIG. 5A, the eye exceeds a threshold angle, this may be considered an activation event.

In embodiments, determining that the user's gaze reaches activation threshold 503 or approaches the edge of range 502 comprises approximating the position of the user's head. For example, rather than directly measuring the head position, a moving average of eye angles may be determined and used to infer the user's head position. This determination may take advantage of the fact that users naturally turn their head towards an object that they want to look at after a short delay.

Figure 5B:
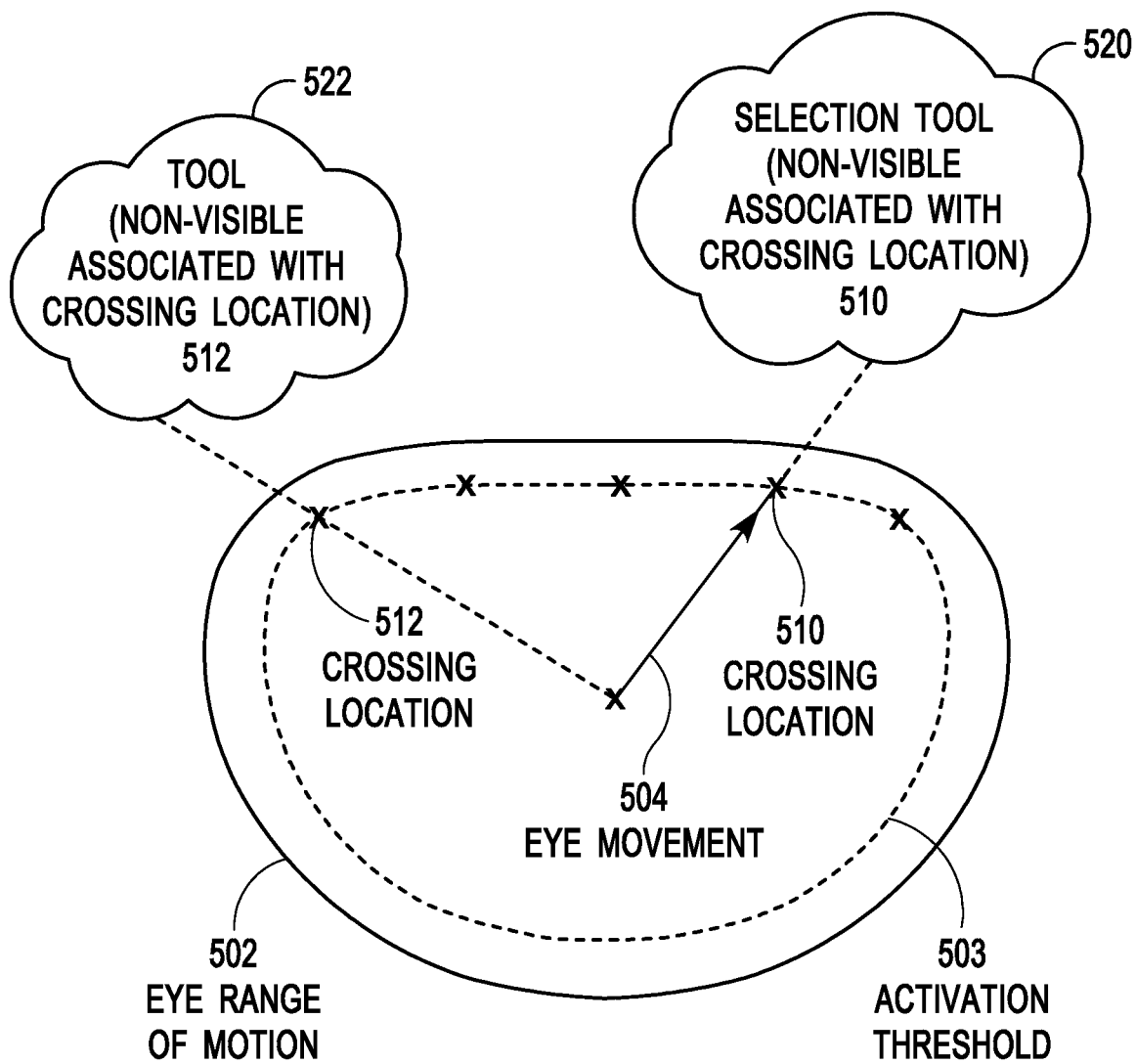
FIG. 5B illustrates a method for using an activation threshold to select a tool according to embodiments of the present disclosure.

FIG. 5B illustrates a method for using an activation threshold to select a tool according to embodiments of the present disclosure. Depicted are eye range of motion 502, activation threshold 503 comprising crossing locations 510 and 512 that are associated with to-be activated but not yet visible tools 520 and 522, respectively. Since users tend to not glance upward as often as they glance to the left, right, or downward, in embodiments, glancing upward past activation threshold 503 may be interpreted as an activation or selection event. The user's eye movement 504 at a given angle or along a given path that crosses activation threshold 503 at crossing location 510 may serve as an indication of the user's intent to activate or select one tool 520 over another tool 522.

In embodiments, one or more predetermined angles or activation areas (e.g., near a given crossing location) may be utilized to initiate one or more actions. It is understood that activation may be completely independent of tool section. For example, glancing at or past activation threshold 503 may be interpreted as an activation that does not involve a tool selection.

Certain embodiments may take advantage of a low-power "watchdog mode" feature of existing accelerometer devices that enable exiting a sleep mode upon detecting a relatively large acceleration. It is understood that in an electronic contact lens the acceleration may be independent of activation threshold 503 or crossing locations 510. For example, the electronic contact lens may set one or more accelerometers to detect an acceleration that is caused by a relatively large saccade, and upon detecting the saccade, wake the system. In embodiments, the combination of a relatively large saccade and acceleration may wake a system. In embodiments, such combination may be used as a first pass to determine the presence of a wake signal, for example, in conjunction with other or additional sensors that may detect whether the eye is at or crosses a certain angle, and if not, remain in sleep/standby mode.

Saccades, which may have a range of distances, may be directed toward or reach an edge of range of motion 502. The distance of a saccade may be estimated using any eye tracking method described herein. For example, given that a larger saccade is likely to reach the end of range of motion 502, a detected change in angle or the speed of that change may be used to infer a relatively long saccade, which may then be interpreted as an activation, e.g., in a given direction.

Figure 7:
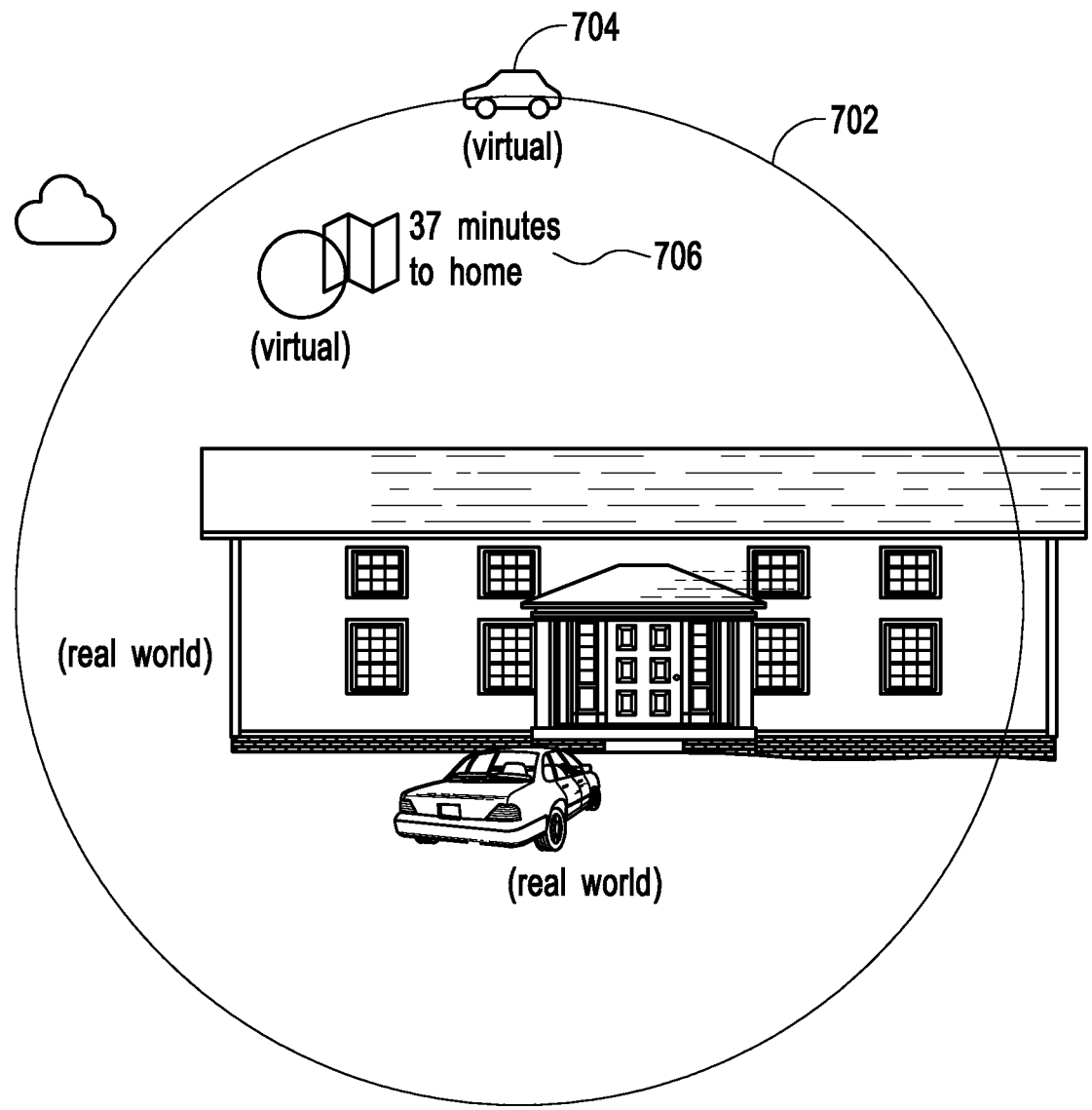
FIG. 7 illustrates an exemplary method for activating tools by looking at a periphery according to embodiments of the present disclosure.
Figure 8:
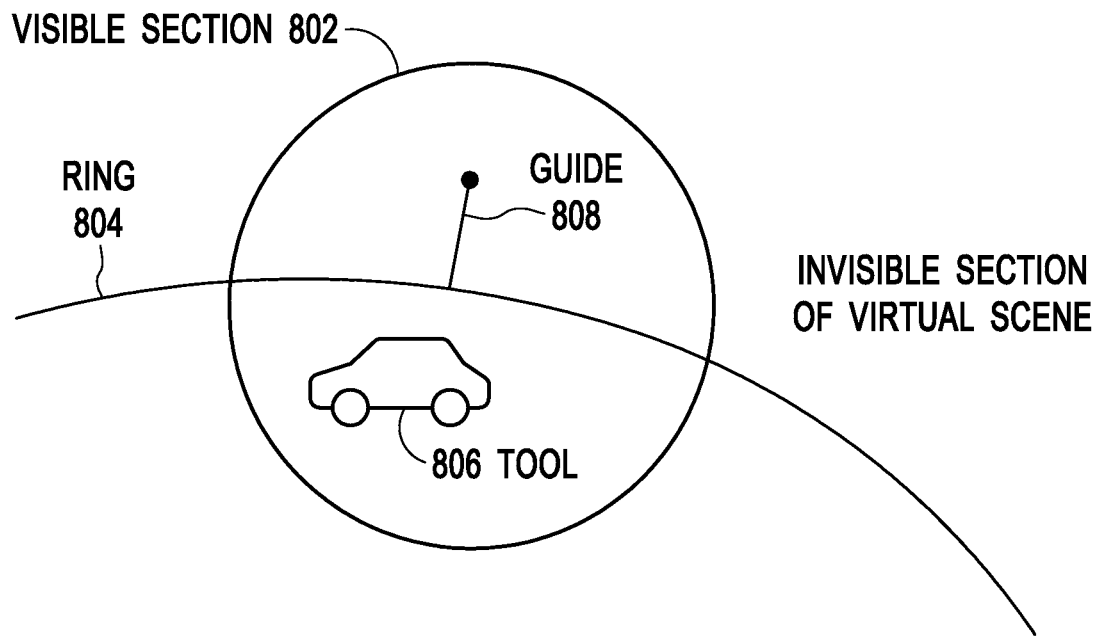
FIG. 8 illustrates an exemplary guide feature according to embodiments of the present disclosure.

A user's neck movement when turning the head is typically accompanied by a quick saccade in the direction of the new target. Therefore, in embodiments, to avoid triggering a false activation based on a misinterpretation of the user's turning their head in their environment as a long saccade, the EMD system may take into account a pause or other gesture that the user may have been instructed to make before turning their head. In embodiments, the user's intent to activate or select may be derived from the user directing the gaze, e.g., by lifting the chin, to a predetermined direction or location that comprises persistent or expected elements in the virtual field, for example dots at or above a certain threshold of elevation. It is understood that the threshold may not necessarily be within eye range of motion 502. In embodiments, once the user directs the gaze at such direction or location, user interface activation elements (here, dots) may become visible in the electronic contact lens. Once it is detected that the user looks at an activation element, the system may activate and, e.g., bring up a ring of tools in a virtual scene as shown in FIG. 7 and FIG. 8.

Figure 5C:
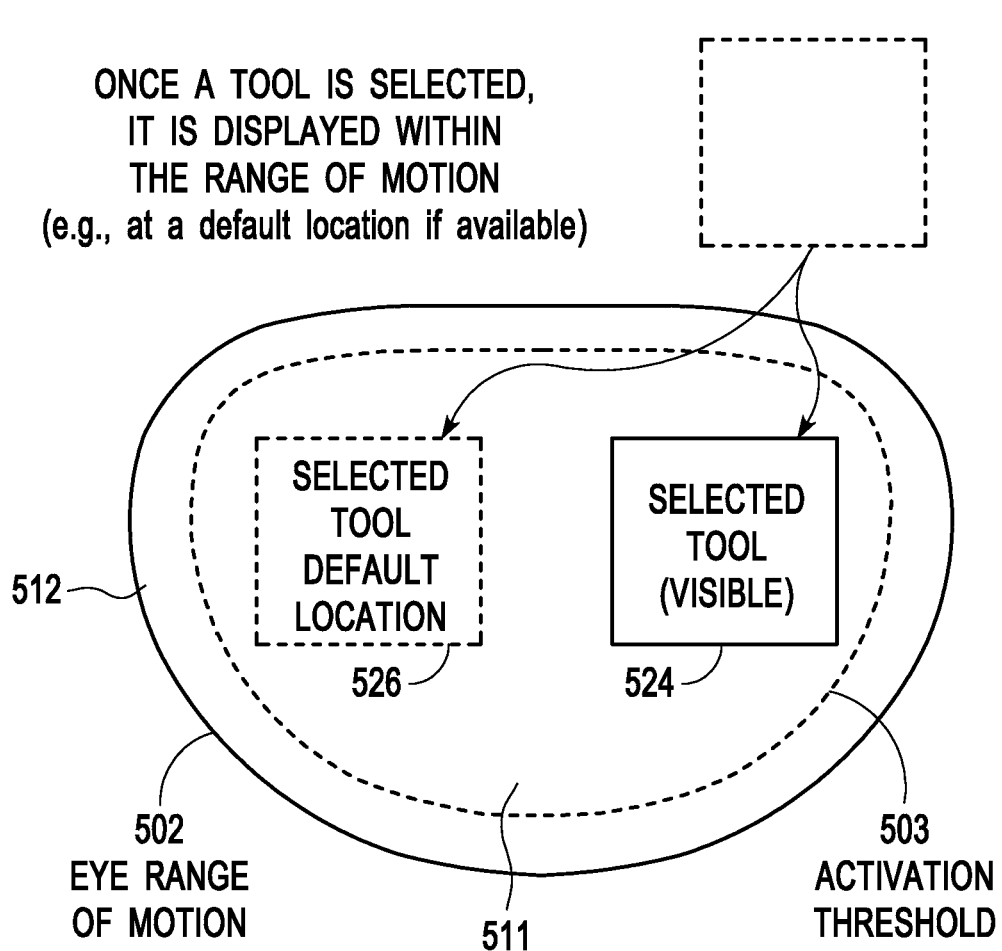
FIG. 5C illustrates a method for displaying a selected a tool according to embodiments of the present disclosure.

FIG. 5C illustrates a method for displaying a selected a tool according to embodiments of the present disclosure. As previously described, a user has an eye range of motion 502 in which the user may interact with various tools within a virtual scene. This eye range of motion may be divided by the activation threshold 503 into an inner area 511 and an outer area 512. This partition of the eye range of motion 502 allows a user to select and activate tools. In embodiments, once tools (e.g., 524) have been selected, they may be displayed within eye range of motion 502. The location(s) to display the selected tools (e.g., 524) may be at a predetermined location, such as default location 526. In certain examples, one or more tools that are not activated are shown within the outer area 512 and may be activated by a user when an eye position crosses the activation threshold 503 and looks at a particular tool. In other examples, the tools are not shown within the outer area 512 but certain tools are associated with portions of the outer area 512 so that when a user eye position crosses the activation threshold 503, the system associates a portion of the outer area 512 with a tool and then activates it. In embodiments, the location may be adaptively chosen depending on virtual or real objects that may already present in the user's range of motion 502, e.g., such as to prevent certain virtual objects from overlapping with certain real-world objects.

In embodiments, once an eye motion approaches the edge of range 502, tools, leading lines, a ring, or any other structure(s) may be displayed to assist the user in identifying and/or selecting tools that have been activated and tools that have not been activated within the virtual scene. For example, different colors may be implemented within the virtual scene to identify an activated tool versus non-activated tools. Also, the threshold within the virtual scene may have a variety of shapes to differentiate between activated tools and non-activated tools.

Figure 5D:
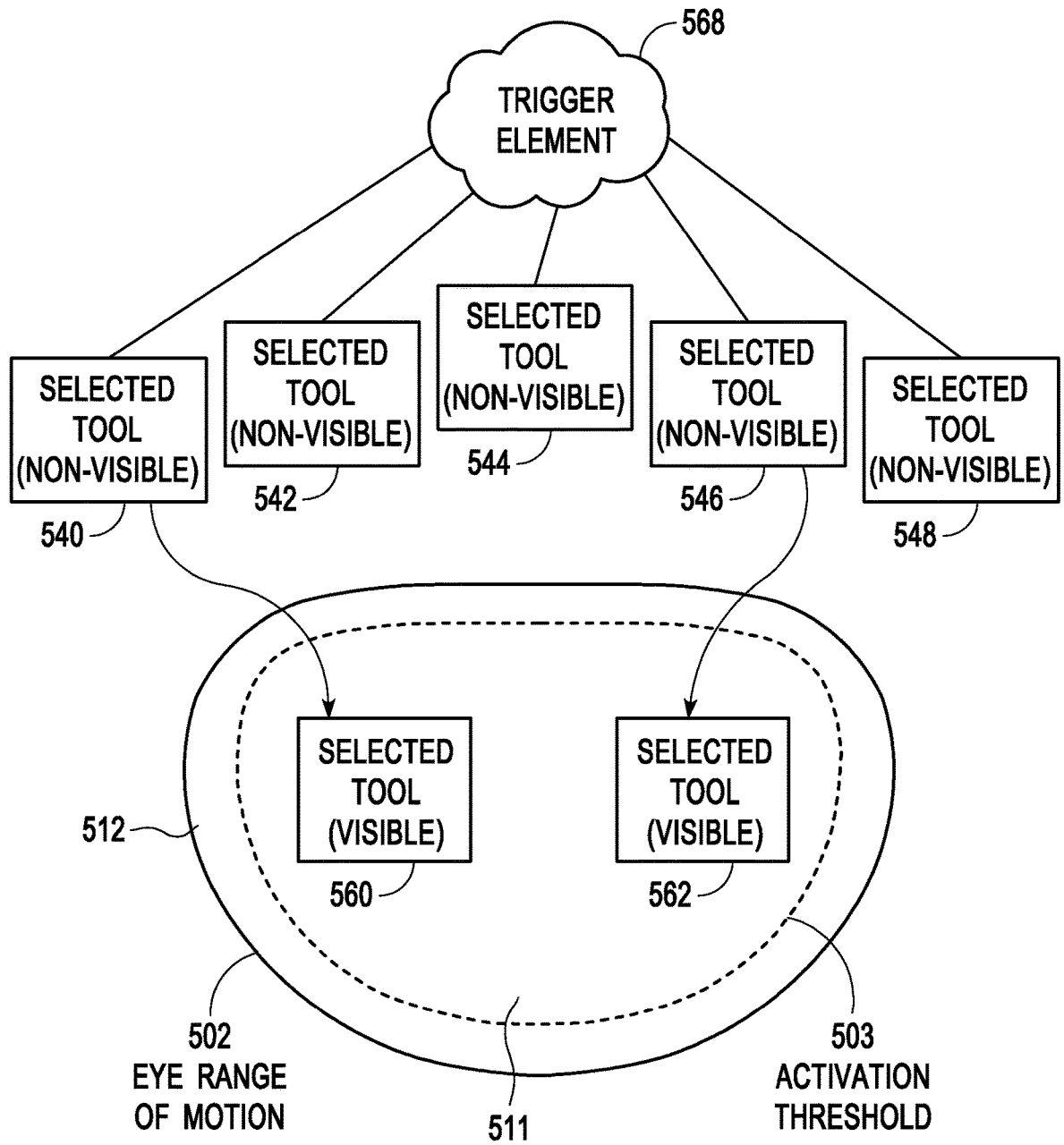
FIG. 5D illustrates a method for using an auxiliary device to select several tools for display according to embodiments of the present disclosure.

FIG. 5D illustrates a method for using an auxiliary device to select several tools for display according to embodiments of the present disclosure. Auxiliary device 566 in FIG. 5D may be a smartphone, sensor, or any other electronic device that may be capable of communicating with an EMD system. In embodiments, once activated, e.g., by tapping, auxiliary device 566 may activate the display of contact lens and causes trigger element 568 to activate the contact lens and/or a number of tools and select a subset or all of the activated tools for display in range of motion 502, including the inner area 511 and the outer area 512. As depicted in FIG. 5D, all tools 540-548 are activated, but only those tools that have been (pre-)selected 540, 546 are displayed, i.e., made visible 530, 532 in range 502. In certain examples, one or more tools may be initially displayed within the outer area 512 and then one selected by the user, which results in the selected tool then transitioning to the inner area 511. In other examples, the selected tools may appear within the inner area 511 once the tools are activated by a user interacting with the auxiliary device 566. In other embodiments, multiple tools 540-548 may be initially shown within the outer area after a user eye position passes the activation threshold 503. As a result, a user may then select one of the tools which will cause the tool to transition to the inner area 511.

In embodiments, the subset of tools 560, 562 may be chosen based on context. For example, a tool for communicating bank account information may be selected based on the EMD system detecting that its current environment is a bank.

Figure 5E:
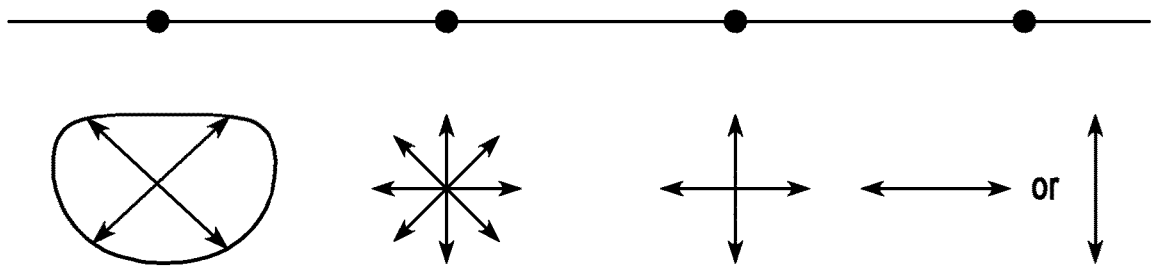
FIG. 5E illustrates a set of exemplary angles for facilitating an activation according to embodiments of the present disclosure.

FIG. 5E illustrates a set of exemplary angles for facilitating an activation according to embodiments of the present disclosure. In addition to using an eye movement that crosses an activation threshold at a given location, user intent to activate or trigger a contact lens display may be inferred from eye motion and/or distance of the eye movement, e.g., at predetermined angle(s).

In embodiments, rather than permitting activation from any arbitrary angle, it may be advantageous to restrict the pitch and yaw angles that activate the EMD system, e.g., to reduce the number of false positives, or to facilitate detection. This may be accomplished by preventing certain patterns associated with regular real-world eye motions from activating the system. In addition, pitch and yaw angles may be restricted to permit activation with less technically advanced EMD systems. As an example, activation directions may be limited to 8, 4, or 2 permissible directions, or even a single direction.

Figure 5F:
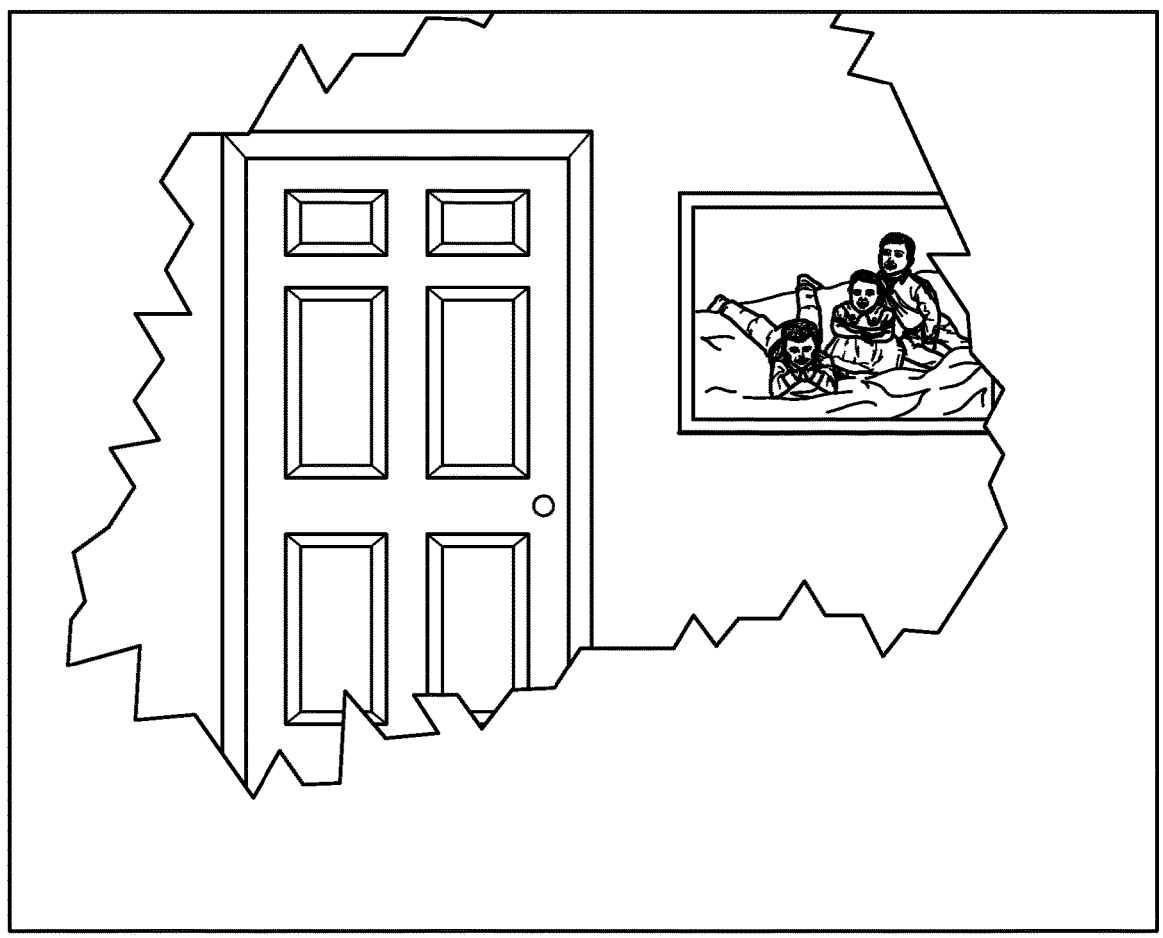
FIG. 5F illustrates an exemplary method for calibrating a user's eye range of motion according to embodiments of the present disclosure.

FIG. 5F illustrates an exemplary method for calibrating a user's eye range of motion according to embodiments of the present disclosure. In embodiments, a user's eye range of motion may be measured, e.g., as part of a calibration procedure that may adaptively adjust thresholds and compensate for users' eye range of motion based on individual characteristics, such as age and other vision-related characteristics. For example, in a VR system, calibration may comprise, for example, prompting a user to uncover as much as possible of head-locked virtual scene 580 by scanning virtual scene 580 with their eye. Then, the extent of the area the user was able to reveal in virtual scene 580 may determine a custom range of motion at any given angle from a straight-ahead view. In an EMD system a head-locked display may be used, and the user may be asked to expand a "rubber band" as much as possible.

In embodiments, e.g., as part of the calibration procedure, a user may adjust, i.e., grow or shrink, the activation threshold or adjust the shape of the activation threshold, i.e., the shape of the periphery beyond which the system will recognize an activation. In embodiments, the user may perform adjustment tasks by using any type of physical or virtual buttons, voice commands, a companion mobile phone app, and the like.

Figure 5G:
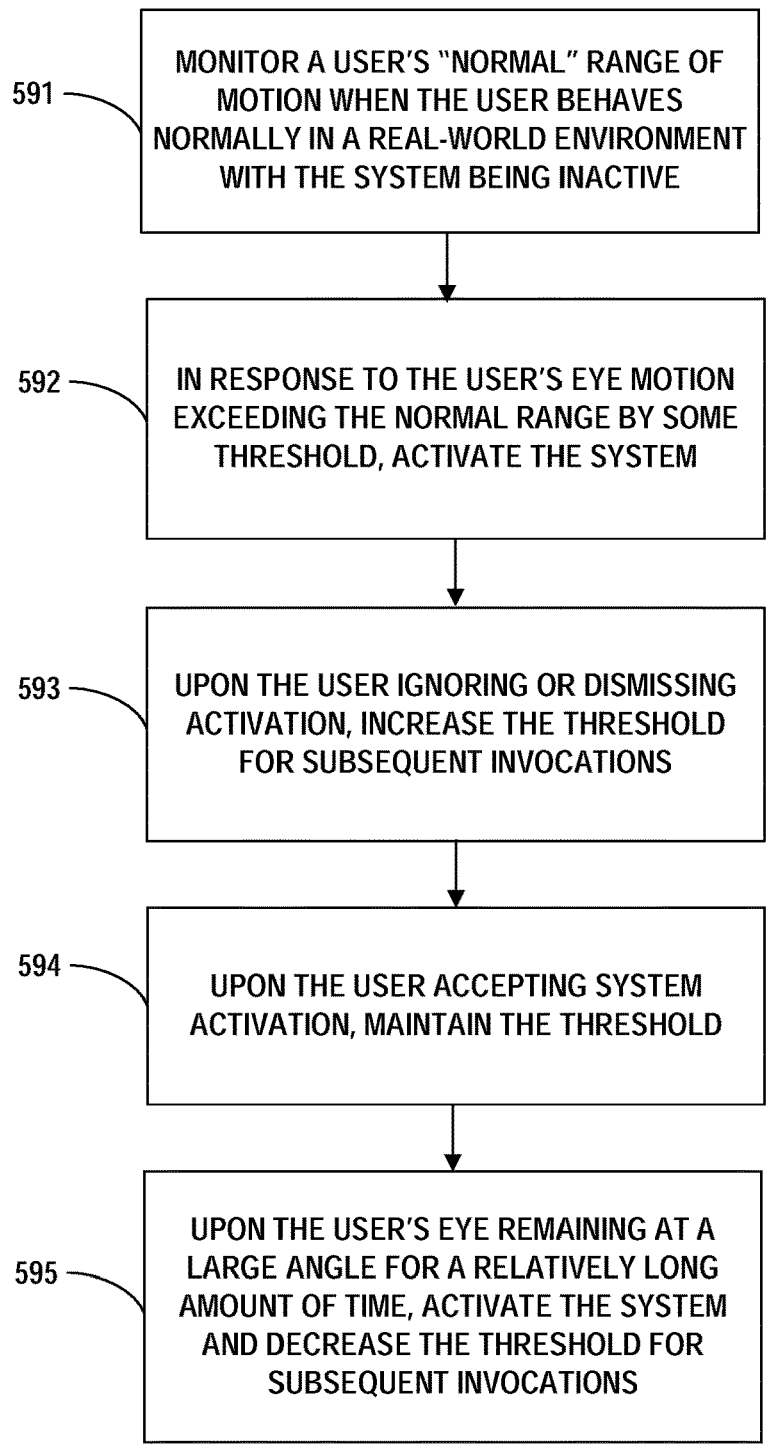
FIG. 5G illustrates an exemplary process for automatically adjusting activation sensitivity according to embodiments of the present disclosure.

FIG. 5G illustrates an exemplary process for automatically adjusting activation sensitivity according to embodiments of the present disclosure. In embodiments, process 590 begins at step 591 when a user's "normal" range of motion is monitored while the user behaves normally in a real-world environment with the system being inactive.

At step 592, in response to the user's eye motion exceeding the normal range by some threshold, the system may be activated.

At step 593, if the user ignores or dismisses system activation within a given time period, the activation at step 592 is considered a false activation, and the threshold may be increased by a certain amount for subsequent invocations.

Conversely, at step 594, if the user accepts system activation, e.g., by engaging with and using the system, the activation at step 592 is deemed a successful, and the threshold is maintained.

At step 595, if the user's eye remains at a large angle for a relatively long amount of time, this may be interpreted as an attempt to activate the system, such that the system is activated, at step 596, and the threshold is decreased for subsequent invocations. It is noted that there any number of thresholds may exist for various angles in the user's range of motion. For example, a threshold in the upward direction may be smaller than the threshold in the right or left directions where users tend to spend more time.

Advantageously, the calibration and compensation methods herein may automatically adapt to different users and automatically adapt to a specific user as that user becomes more familiar with the system. For example, the system may monitor the specific capabilities of a user and adjust an activation threshold or a way in which virtual tools are displayed based on a historical analysis of how the user has interacted successfully and unsuccessfully in activating virtual tools. In addition, these methods facilitate ease of activation while, at the same time, reducing the number of false positives.

Figure 6A:
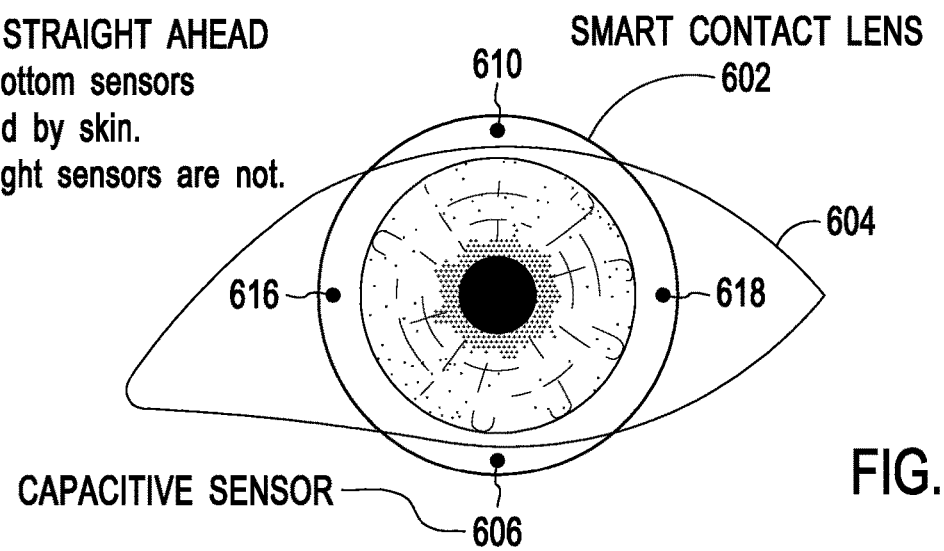
FIG. 6A-FIG. 6C illustrate exemplary methods for measuring eye position in an eye socket using capacitive skin sensors in a contact lens according to embodiments of the present disclosure.
Figure 6B:
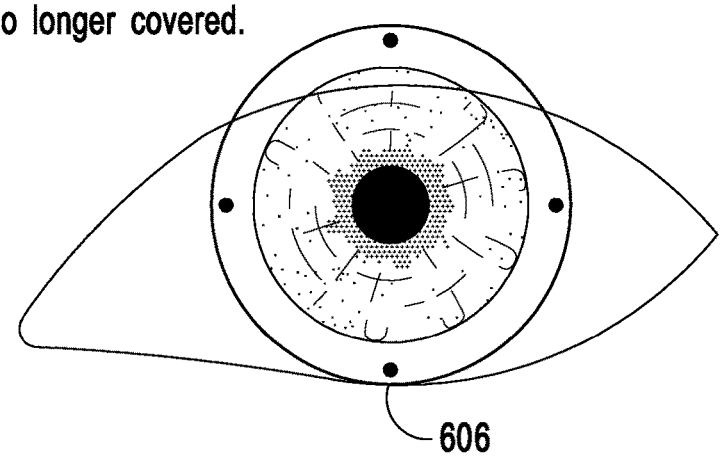
Figure 6C:
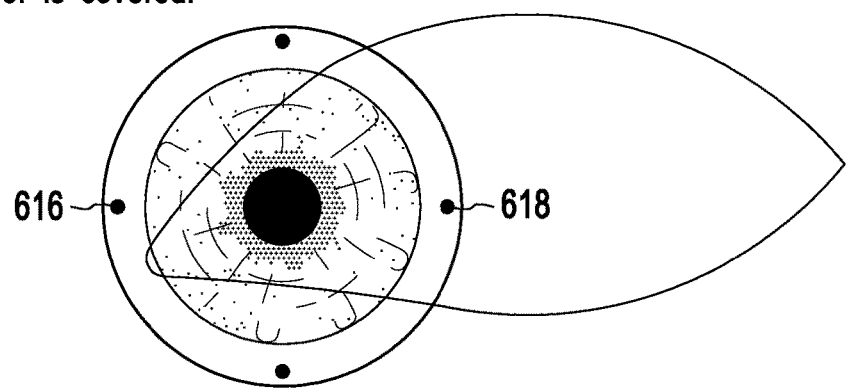

FIG. 6A-FIG. 6C illustrate exemplary methods for measuring eye position in an eye socket using capacitive skin sensors in a contact lens according to embodiments of the present disclosure. In embodiments, position of eye 604 within its eye socket may be measured using capacitive skin sensors (e.g., 606). Smart contact lens 602 may comprise several capacitive sensors that may be built-in and used to detect the degree of skin (here, eye lid) that covers a number of sensors (e.g., 610). When eye 604 rotates in the eye socket, a capacitive reading will be greater for parts of contact lens 602 that are obscured by skin, and the capacitive reading will be lower for those parts that, at a given angle, are covered less by skin.

For example, in the scenario in FIG. 6A in which the user looks straight ahead, top sensor 610 and bottom sensor 606 are both covered by skin, whereas left sensor 616 and right sensor 616 are not. In FIG. 6B once the user looks upwards, the top bottom sensor 606 is no longer covered by skin. In FIG. 6C when the user looks to the right, in addition to both top and bottom sensors 610, 606 remaining covered, right sensor 616 is also covered by skin.

As a person of skill in the art will appreciate, capacitive readings may serve as a measure of rotation, i.e., the relative angle, of eye 604. A person of skill in the art will further appreciate that a suitable number of capacitive sensors may be selected to achieve a desired accuracy.

In embodiments, once it is detected that a user looks towards or at a periphery of an exemplary arrangement of virtual objects in a virtual scene, tools arranged along visible or partially visible paths may be activated in various ways. For example, as shown in FIG. 7, in response to detecting that a user looks upward towards partially visible ring 702 in virtual scene 700, tool 704 may be activated and reveal a previously not visible item, here, a car icon located at perimeter 710. In addition, driving time tool 706 is displayed at a predetermined location, e.g., at another angle.

As shown in FIG. 8, tool 806 may be a virtual object that exist on visible section 802 of ring 804, i.e., located within user's SoE. Ring 804 may provide a visible guide 808 to other tools (not shown in FIG. 8). This visual framework will allow a user to identify and select a series of virtual tools that are related by visually following guide feature 808 that identifies a second virtual tool related to the first tool 806. Certain embodiments of the activation of related virtual tools are described in more detail below.

Figure 9:
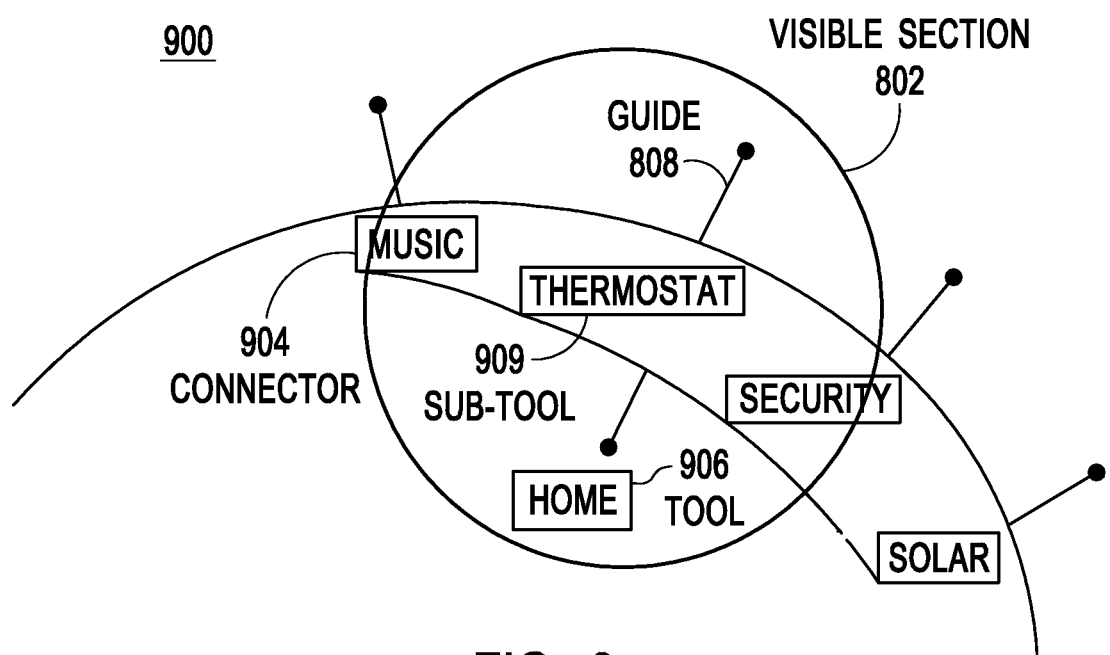
FIG. 9 illustrates how an exemplary tool in a hierarchical tool set may reveal the presence of selectable sub-tools according to embodiments of the present disclosure.

FIG. 9 illustrates how an exemplary tool in a hierarchical tool set may reveal the presence of selectable sub-tools according to embodiments of the present disclosure. A user's gaze may be used to reveal objects in exemplary virtual scene 900. FIG. 9 depicts a two-dimensional arrangement of virtual objects that comprises multi-level hierarchical navigation tools. Two hierarchy levels are represented by tool 906 (labeled home) and sub-tool 908 (labeled music, thermostat, security, and solar) that are displayed as words arranged along ring 804 to lead the user's attention from one sub-tool 909 to another.

The arrangement of tool 906 and sub-tools 909 in FIG. 9 is chosen such that a set of words representing sub-tool 909 of tool 806 (home) is separated by connector 904. Sub-tools 909 appear on one side of connector 904 and opposite to tool 906. In embodiments, connector 904 between virtual objects guides the user's gaze in the coordinate space of virtual scene 900. In embodiments, as the user's gaze moves, the content of visible section 802 is controlled, in concert with the user's eye motion, to smoothly transition and display different sections of virtual scene 900. This way, the user has the experience of "looking around" in virtual scene 900.

In embodiments, tool 906 may be used as a selectable navigation tool that, once invoked by one or more of the methods previously mentioned, reveals sub-tool 909, which itself may be selectable. Sub-tool 909, in turn, may reveal other levels of hierarchy (not shown), thereby, facilitating the navigation of a multi-level hierarchy, advantageously, without the need for employing external or auxiliary selection devices.

It is noted that this embodiment visually separates two levels of hierarchy. However, this is not intended as a limitation on the scope of the present disclosure. The user's gaze may be directed in any other way to select any hierarchy of tools.

In embodiments, a tool (e.g., displayed in the form of an icon) may be activated and highlighted, for example, by visibly changing the appearance of the tool to distinguish it from other virtual or real-world objects, e.g., by animating it or by altering the characteristics or the appearance (color, shape, size, depth, etc.) of the selected tool and/or any item associated therewith. This may indicate that the tool is ready to be activated or ready to invoke another tool.

In embodiments, rather than activating a tool in this manner, the tool may, upon being selected, immediately invoke or activate another tool. For example, once the eye reaches a tool, the tool may be activated and projected at or near the center of the user's range of motion that may or may not be the direction the user's gaze is directed towards.

FIG. 10 A-FIG. 10D illustrate an exemplary method for highlighting tools in one or more steps according to embodiments of the present disclosure. As depicted in FIG. 10A, a user may move the eye from nominal position 1002 within the eye's range of motion 502 toward a designated area at periphery 1004 of range of motion 502 to wake and/or instantly activate the system with or without receiving visual feedback of successful activation. Such activation may cause tool 1006 to be immediately available within a virtual scene when, or even before the user's gaze arrives at the location of tool 1006. In embodiments, once the user reaches the tool area, tool 1006 may be made be visible within visible area 1008 of virtual scene. In embodiments, once the user's eye saccades in some angle toward a crossing location of an activation threshold at the edge of range of motion 502 to activate a tool (e.g., 1006), and then saccades back (e.g., to starting point 1002), the to-be-activated tool 1006 may be already activated and available by the time the user's gaze returns to staring point 1002 such as to allow for rapid tool activation.

A user's tendency to direct eyes toward the edges (e.g., 1004) of the eye's range of motion 502 when turning the head to look around is a potential source for triggering false activations. Therefore, to reduce the number of false positives, an activation may be suppressed by detecting, e.g., via head-mounted IMUs or by inferring it from a recent history of eye locations or movements, that the user's head has moved just before or just after an eye motion event. In embodiments, the ability to activate a system by, e.g., a glance to the side, may be preconditioned on the user's head motion not exceeding some type of threshold speed, such as distance, angle, and the like.

FIG. 11 illustrates exemplary methods for interpreting a user's eye motion as an activation or tentative activation of the system according to embodiments of the present disclosure. To further reduce false positives that may result in inadvertent activations, eye gesture related data may be evaluated to determine whether an eye motion or a sequence of eye motions was made intentionally.

In embodiments, once the user glances to make a relatively small saccade predefined direction, e.g., upward, before glancing, e.g., at some angle, in a desired direction within the eye's range of motion, the glance upward may be interpreted as a tentative activation of the system. The subsequent glance that may involve a relatively large saccade may be interpreted as an intent to initiate an activation. In embodiments, the direction of the second saccade may be used as an indication of which tool the user wants to select. For example, upward saccade 1102 followed by left-hand side saccade 1104 may invoke tool 1; a relatively small upward saccade 1110 followed by another upward saccade 1112 may invoke tool 2; an upward saccade 1120 followed by a right-hand side saccade 1122 may invoke tool 3, and so on. Conversely, an upward saccade 1102 or 1120 followed by a "normal" pattern, e.g., glancing around with no discernible pattern that matches a set of predetermined patterns or directions may be discarded and/or interpreted as the user's intent to not (yet) activate the system or select a tool.

Other eye gestures that may be interpreted as an intent to activate the system comprise the user glancing to an extreme direction and pausing momentarily, or the user making a long saccade in one direction followed by a long saccade in the opposite direction to the starting point, e.g., up-down, down-up, left-right, or right-left.

It is understood that any gesture, such as those exemplified in FIG. 11, may be combined with other gestures and/or actions, and that any number of steps may be used to define a set of gestures. For example, a head nod followed by a saccade to an edge; a button press to activate the system followed by a glance to the edge; and so on. It is further understood that some of the disclosed approaches herein are compatible with systems, such as existing AR/VR technologies, that do not utilize head tracking, eye tracking, or tracking of the eye within the eye socket.

Figure 12:
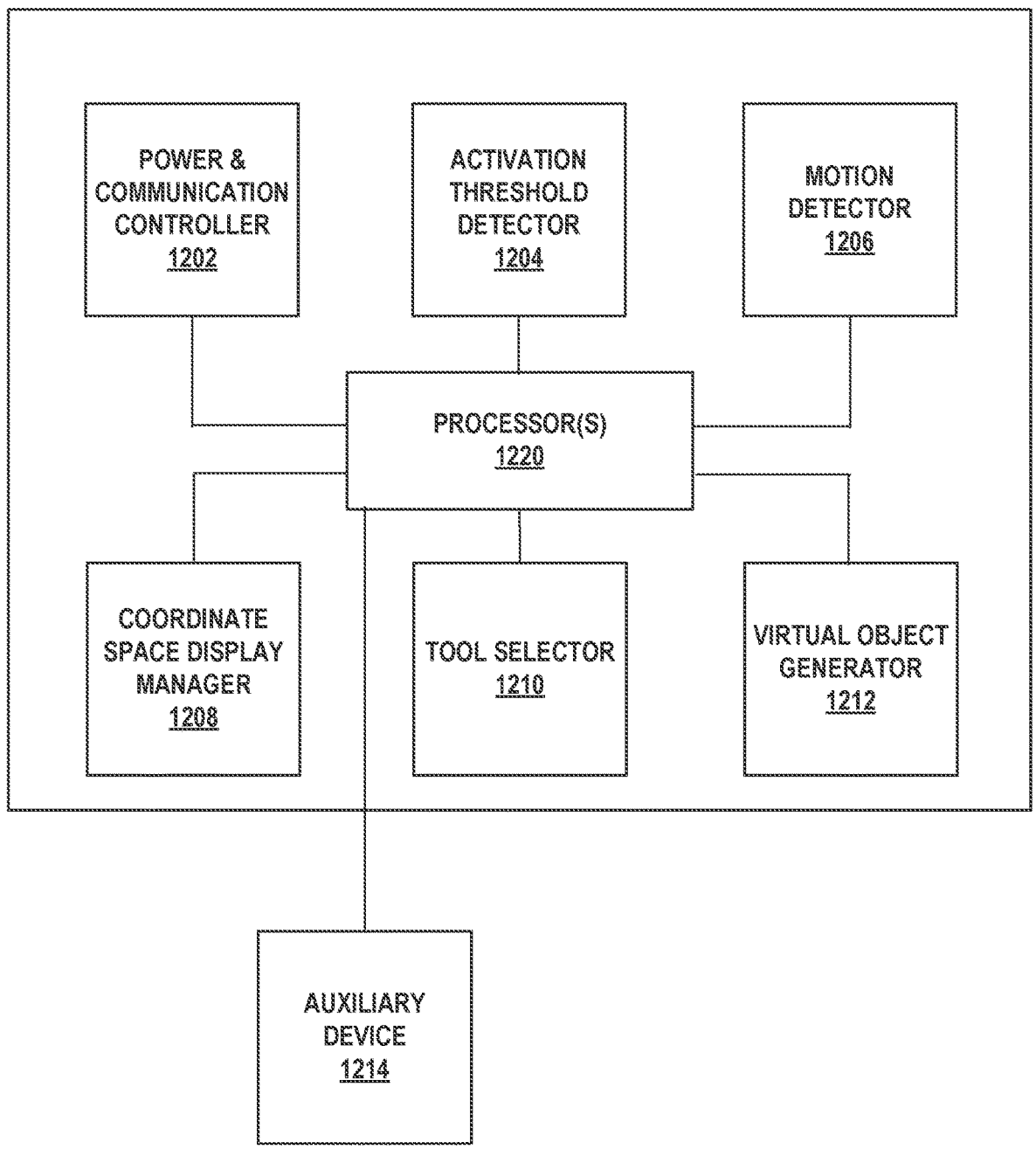
FIG. 12 illustrates an eye-based activation and tool selection system according to embodiments of the present disclosure.

FIG. 12 illustrates an eye-based activation and tool selection system according to embodiments of the present disclosure. As depicted, eye-based activation and tool selection system 1200 comprises processor(s) 1220 that is communicatively coupled to and coordinates functions of individual modules of system 1200. The modules may comprise power and communication controller 1202, activation threshold detector 1204, motion detector 1206, coordinate space display manager 1208, tool selector 1210, and virtual object generator 1212. In addition, system 1200 may be coupled to auxiliary device 1214. It is understood that any part of activation and tool selection system 1200 may be implemented on a contact lens and/or an accessory device (not shown) that communicate with each other according to embodiments presented herein.

In operation, power and communication controller 1202 may aid in distribution, harvesting, monitoring, and control of power to facilitate operation of activation and tool selection system 1200, including internal and external communication of data and control commands between components and sub-components. In embodiments, coordinate space display manager 1208 may define a virtual space according to a coordinate system as shown in FIG. 2B to map virtual objects onto the virtual space. Coordinate space display manager 1208 may control content and spatial relationships of virtual objects within the coordinate system that is fixed in one or more degrees of freedom with respect to at least one real-world object, such as a user's headgear, or with respect to gravity and earth magnetic field. In embodiments, coordinate space display manager 1208 may be communicatively coupled to a display controller that may determine what images the display optics renders on the user's retina.

Activation threshold detector 1204 controls the generation, appearance, and location of an activation threshold relative to the user's eye range of motion. Tool selector 1210 may reveal or conceal the presence of virtual objects in response to data input from motion detector 1206 that may comprise motion and other sensors. Data gathered from motion detector 1206 is used to track and interpret a user's eye-movements in a manner such as to distinguish between eye and/or head movements that are aimed at initiating an action involving an activation versus an action involving a selection of one or more virtual objects, such as navigation tools that may be used to select the type(s) of information to be displayed based on the user's eye movements.

Figure 13:
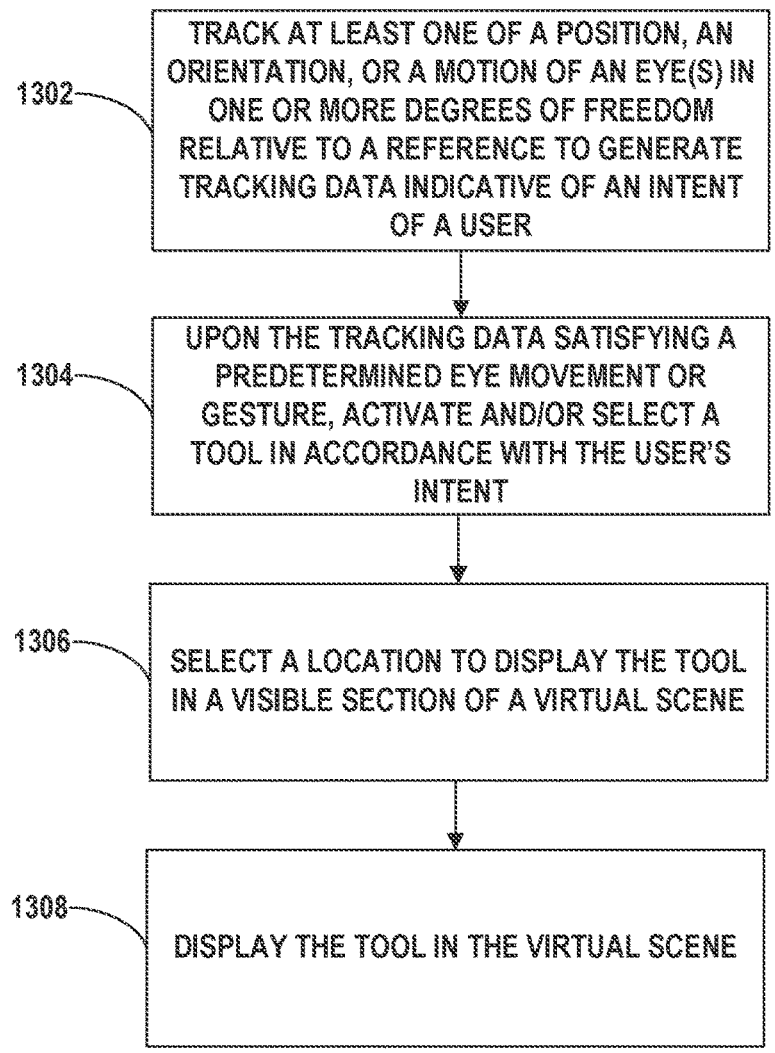
FIG. 13 illustrates a process for using an eye-based activation and tool selection system according to embodiments of the present disclosure.

FIG. 13 illustrates a process for using an eye-based activation and tool selection system according to embodiments of the present disclosure. Process 1300 may begin, at step 1302, when at least one of a position, an orientation, or a motion of an eye is tracked in one or more degrees of freedom (e.g., relative to a reference frame) to generate tracking data.

Eye-tracking may be performed according to any of the methods used herein. The generated tracking data may comprise information that is indicative of an intent of a user. For example, an eye motion may comprise any number of eye gestures indicative of the user's intent to perform an action, such as activating a tool, selecting a tool, or any combinations thereof.

At step 1304, upon determining that the tracking data satisfies a predetermined eye movement or gesture, a tool may be activated and/or selected in accordance with the user's intent.

At step 1306, if a tool has been selected, a location may be chosen to display the tool, e.g., in a visible section of a virtual scene.

Finally, at step 1308, the tool may be so displayed.

Figure 14:
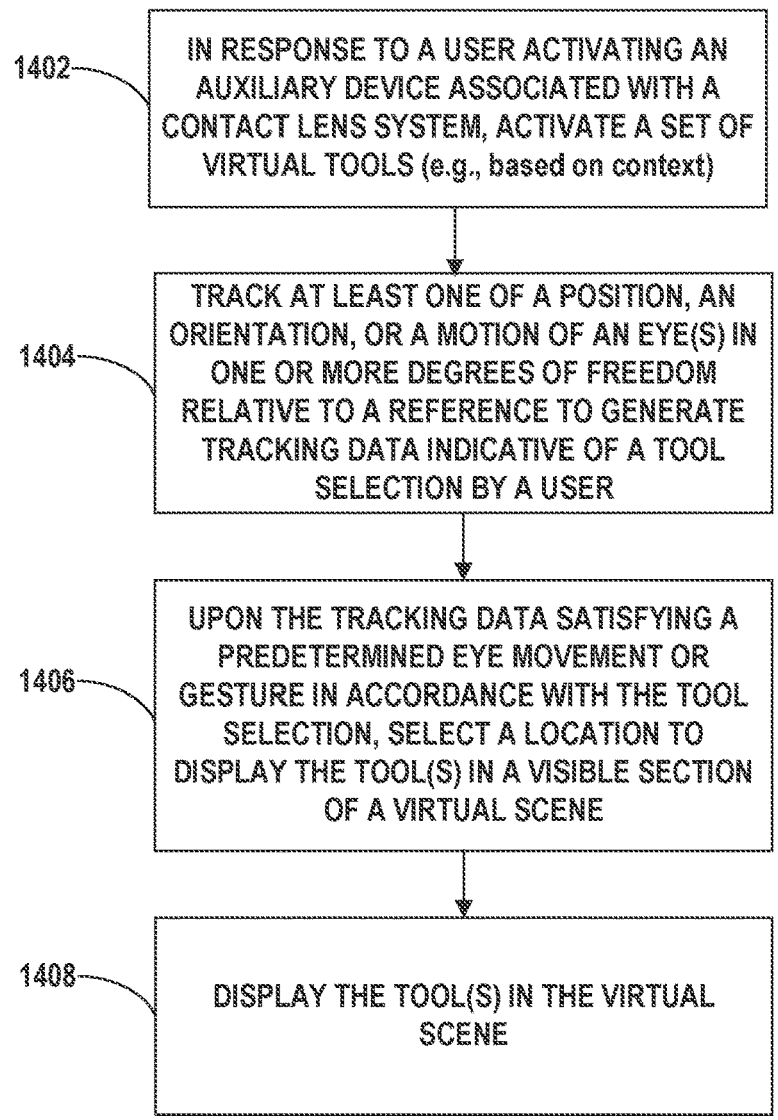
FIG. 14 illustrates another process for using an eye-based activation and tool selection system according to embodiments of the present disclosure.

FIG. 14 illustrates another process for using an eye-based activation and tool selection system according to embodiments of the present disclosure. Process 1400 may begin, at step 1402, when in response to a user activating an auxiliary device associated with an electronic contact lens, e.g., a smart watch, a set of virtual tools is activated, for example, based on context, such as the user's real-world environment.

At step 1404, at least one of a position, an orientation, or a motion of an eye is tracked, e.g., in one or more degrees of freedom relative to a reference frame such as the user's eye socket, to generate tracking data indicative of a tool selection by a user.

At step 1406, upon the tracking data satisfying a predetermined eye movement or gesture in accordance with the tool selection, a location to display the tool(s) may be selected, e.g., in a visible section of a virtual scene.

At step 1408, the tool may then be displayed in that virtual scene.

What is claimed is:

1. An eye-based activation method comprising:
   tracking at least one of a position, an orientation, or a motion of a user's eye within a virtual scene to generate tracking data, wherein eye tracking is performed by a plurality of sensors disposed within a contact lens that when activated projects the virtual scene onto a retina of the user;
   analyzing the tracking data to identify when the at least one position, orientation or motion of the user's eye crosses an activation threshold separating an inner area and an outer area of an eye range of motion, the outer area having a first position associated with a tool;
   in response to the user's eye crossing the activation threshold to the first position, activating a contact lens display;
   determining a second location within the inner area; and
   displaying a tool within the inner area at the second location to allow the user to interact with the tool.

2. The eye-based activation method of claim 1 wherein the virtual scene is projected on the retina using a femto-projector within the contact lens.

3. The eye-based activation method of claim 1 wherein the tool is highlighted to a different color when selected in the outer area.

4. The eye-based activation method of claim 1 wherein at least one sub-tool associated with the selected tool is shown within the inner area after the tool is activated at the second location.

5. The eye-based activation method of claim 1 wherein the step of tracking the at least one of the position, the orientation, or the motion of the user's eye further comprises tracking head movement of the user to supplement the tracking data.

6. The eye-based activation method of claim 1 wherein processing of the tracking data is analyzed by an auxiliary device external to the contact lens, the auxiliary device communicating with the contact lens via at least one wireless communication channel and storing data of the at least one of the position, the orientation, or the motion of a user's eye.

7. The eye-based activation method of claim 6 wherein the step of analyzing the tracking data further comprises a step of processing the stored data such that prior eye saccade movement associated with the user is used to supplement the identification of the user's eye crossing the activation threshold to the first position.

8. The eye-based activation method of claim 6 wherein the stored data is used to modify where the activation threshold is placed within the eye range of motion based on prior eye movements of the user.

9. An eye-based activation method comprising:
tracking at least one of a position, an orientation, or a motion of a user's eye within a virtual scene to generate tracking data, wherein eye tracking is performed by a motion tracker in communication with motion sensors disposed within a contact lens that projects the virtual scene onto a retina of the user;
analyzing the tracking data to identify when the at least one position, orientation or motion of the user's eye crosses an activation threshold separating an inner area and an outer area of an eye range of motion;
in response to the user's eye crossing the activation threshold, activating a contact lens display and showing a plurality of tools within eye range of motion to allow a user to select at least one tool within the plurality of tools;
tracking the user's eye relative to the plurality of tools and identifying when a user selects a first tool within the plurality of tools;
determining a preferred location within the eye range of motion to show the selected tool; and
activating the selected tool at the preferred location to allow the user to interact with the tool.

10. The eye-based activation method of claim 9 wherein the virtual scene is projected on the retina using a femtoprojector within the contact lens.

11. The eye-based activation method of claim 9 wherein the plurality of tools displayed within the eye range of motion is based on a history of user activity.

12. The eye-based activation method of claim 11 wherein the stored history of user activity is maintained within an auxiliary device that is external to the contact lens, the auxiliary device communicating with the contact lens via at least one wireless channel.

13. The eye-based activation method of claim 9 wherein the selected tool transitions to the preferred location using a visible movement within the virtual scene that allows the user to visually track the selected tool to the preferred location.

14. The eye-based activation method of claim 9 wherein at least some of the plurality of tools are removed from the virtual scene after the first tool is selected.

15. A virtual display and tool activation system comprising:
an electronic contact lens comprising:
a femtoprojector coupled to receive data associated with a virtual scene, the femtoprojector projects the virtual scene onto a retina of a user;
a plurality of sensors that track at least one of a position, an orientation, or a motion of a user's eye within the virtual scene and generates tracking data associated with the user's eye movement; and
a transceiver that wirelessly communicates information with an auxiliary device external to the contact lens, the information comprising the tracking data;
one or more processor coupled to communicate with the femtoprojector and the plurality of sensors;
a non-transitory computer-readable medium or media comprising one or more sets of instructions which, when executed by at least one of the one or more processors, causes steps to be performed comprising:
generating data used to construct the virtual scene projected by the femtoprojector;
mapping the virtual scene to a coordinate system that allows user eye movements to be tracked relative to the virtual scene;
using an activation threshold that separates an inner area and an outer area of an eye range of motion and determines when the user's eye movement crosses the threshold wherein a contact lens display is activated and at least one tool is selected in the outer area after the user's eye movement crosses the activation threshold.

16. The virtual display and tool activation system of claim 15 wherein the processor is integrated within the auxiliary device.

17. The virtual display and tool activation system of claim 15 further comprising a motion detector coupled to the processor, the motion detector analyzes the information received from the contact lens to distinguish eye movement from head movement.

18. The virtual display and tool activation system of claim 17 wherein a plurality of tools are shown within the eye range of motion based on historical activity of a user within the system.

* * * * *